US011400377B2

(12) United States Patent
Challinor

(10) Patent No.: US 11,400,377 B2
(45) Date of Patent: Aug. 2, 2022

(54) TECHNIQUES FOR VIDEO GAME INPUT COMPENSATION AND RELATED SYSTEMS AND METHODS

(71) Applicant: Harmonix Music Systems, Inc., Boston, MA (US)

(72) Inventor: Ryan William Challinor, Cambridge, MA (US)

(73) Assignee: Harmonix Music Systems, Inc., Boston, MA (US)

( * ) Notice: Subject to any disclaimer, the term of this patent is extended or adjusted under 35 U.S.C. 154(b) by 0 days.

(21) Appl. No.: 17/002,261

(22) Filed: Aug. 25, 2020

(65) Prior Publication Data

US 2021/0060434 A1 Mar. 4, 2021

Related U.S. Application Data

(60) Provisional application No. 62/891,645, filed on Aug. 26, 2019.

(51) Int. Cl.
*A63F 13/655* (2014.01)
*A63F 13/44* (2014.01)
*A63F 13/213* (2014.01)

(52) U.S. Cl.
CPC .......... *A63F 13/655* (2014.09); *A63F 13/213* (2014.09); *A63F 13/44* (2014.09)

(58) Field of Classification Search
CPC ....... A63F 13/655; A63F 13/213; A63F 13/44
See application file for complete search history.

(56) References Cited

U.S. PATENT DOCUMENTS

| 2006/0084509 A1* | 4/2006 | Novak ................ A63F 13/837 463/30 |
| 2008/0070684 A1* | 3/2008 | Haigh-Hutchinson ..................... A63F 13/04 463/32 |
| 2008/0200224 A1 | 8/2008 | Parks |

(Continued)

FOREIGN PATENT DOCUMENTS

| EP | 2579955 A1 | 4/2013 |
| WO | WO 2011/155958 A1 | 12/2011 |

OTHER PUBLICATIONS

International Search Report and Written Opinion for International Application No. PCT/US2020/047799 dated Oct. 30, 2020.

*Primary Examiner* — Omkar A Deodhar
*Assistant Examiner* — Shauna-Kay Hall
(74) *Attorney, Agent, or Firm* — Wolf, Greenfield & Sacks, P.C.

(57) ABSTRACT

Described herein are techniques for improving user experience in a video game. In some embodiments, the techniques utilize one or more snapshots of the video game over time to adjust a pose of a user's input device in the video game. For example, the user's input device may be a spatially tracked controller which has a tracked pose in the video game. A user input may indicate a button pressed on the spatially tracked controller (e.g., triggering firing of a shot in the video game). In some embodiments, the techniques use the snapshot(s) of the video game that capture instances prior to the user input to adjust a pose of the user input device in the video game to provide an improved user experience.

21 Claims, 16 Drawing Sheets

(56) References Cited

U.S. PATENT DOCUMENTS

| | | | | |
|---|---|---|---|---|
| 2010/0009733 A1* | 1/2010 | Garvin | ............... | A63F 13/22 |
| | | | | 463/37 |
| 2011/0306396 A1* | 12/2011 | Flury | ............... | A63F 13/44 |
| | | | | 463/7 |
| 2012/0083336 A1* | 4/2012 | Ocko | ............... | A63F 13/798 |
| | | | | 463/31 |
| 2017/0282077 A1* | 10/2017 | De La Cruz | ......... | A63F 13/537 |
| 2017/0354888 A1* | 12/2017 | Benedetto | ............ | A63F 13/63 |

* cited by examiner

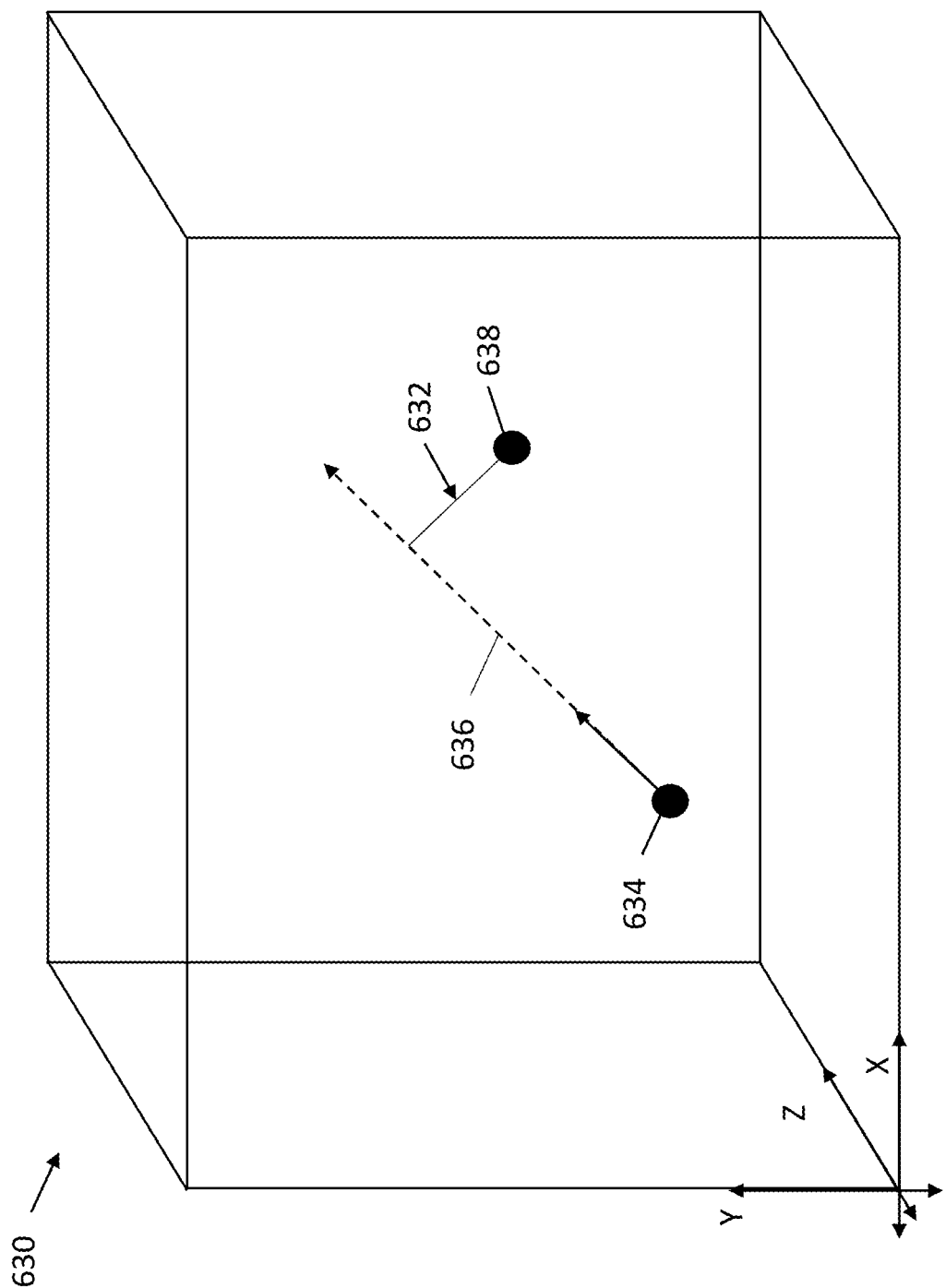

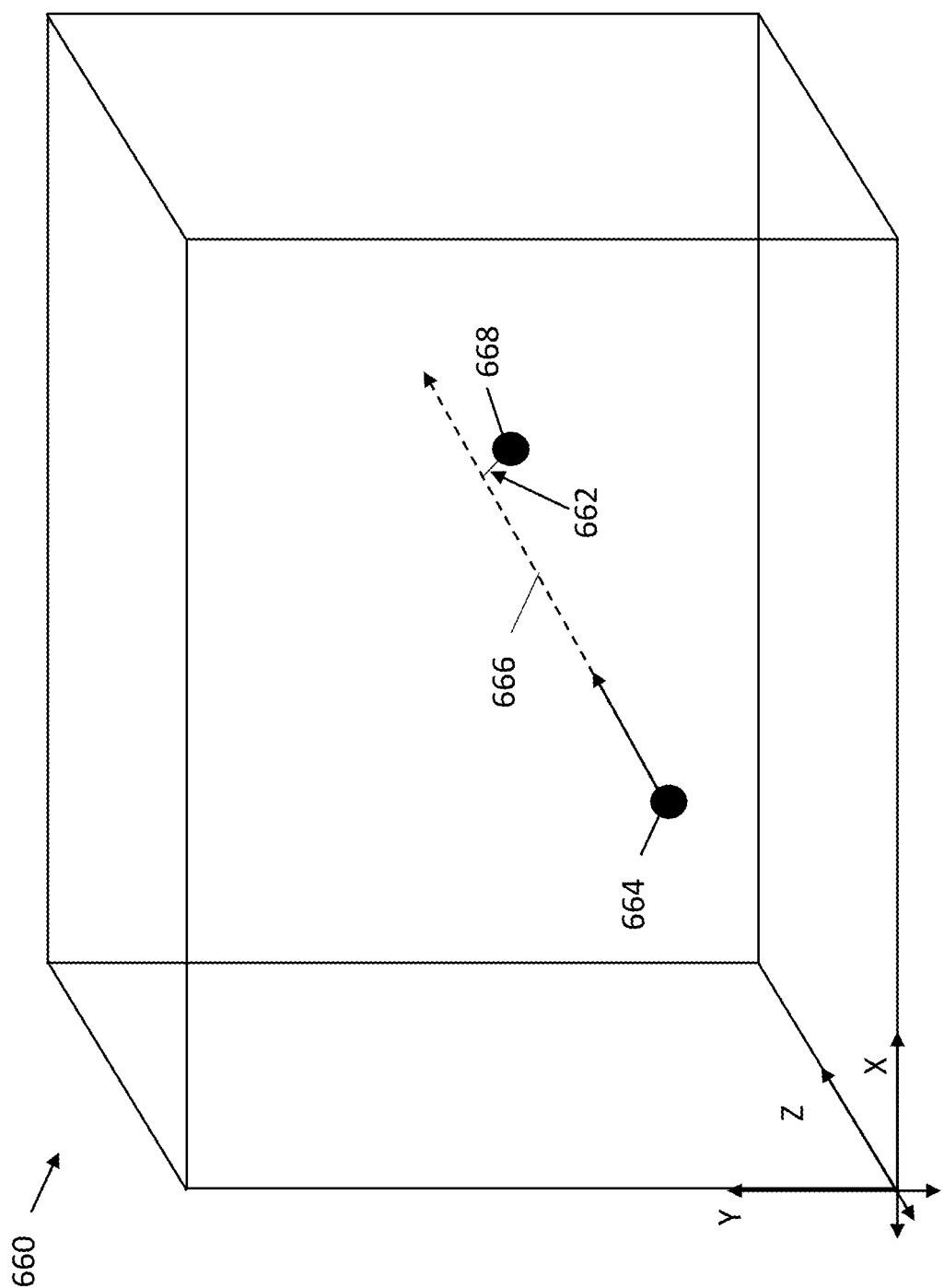

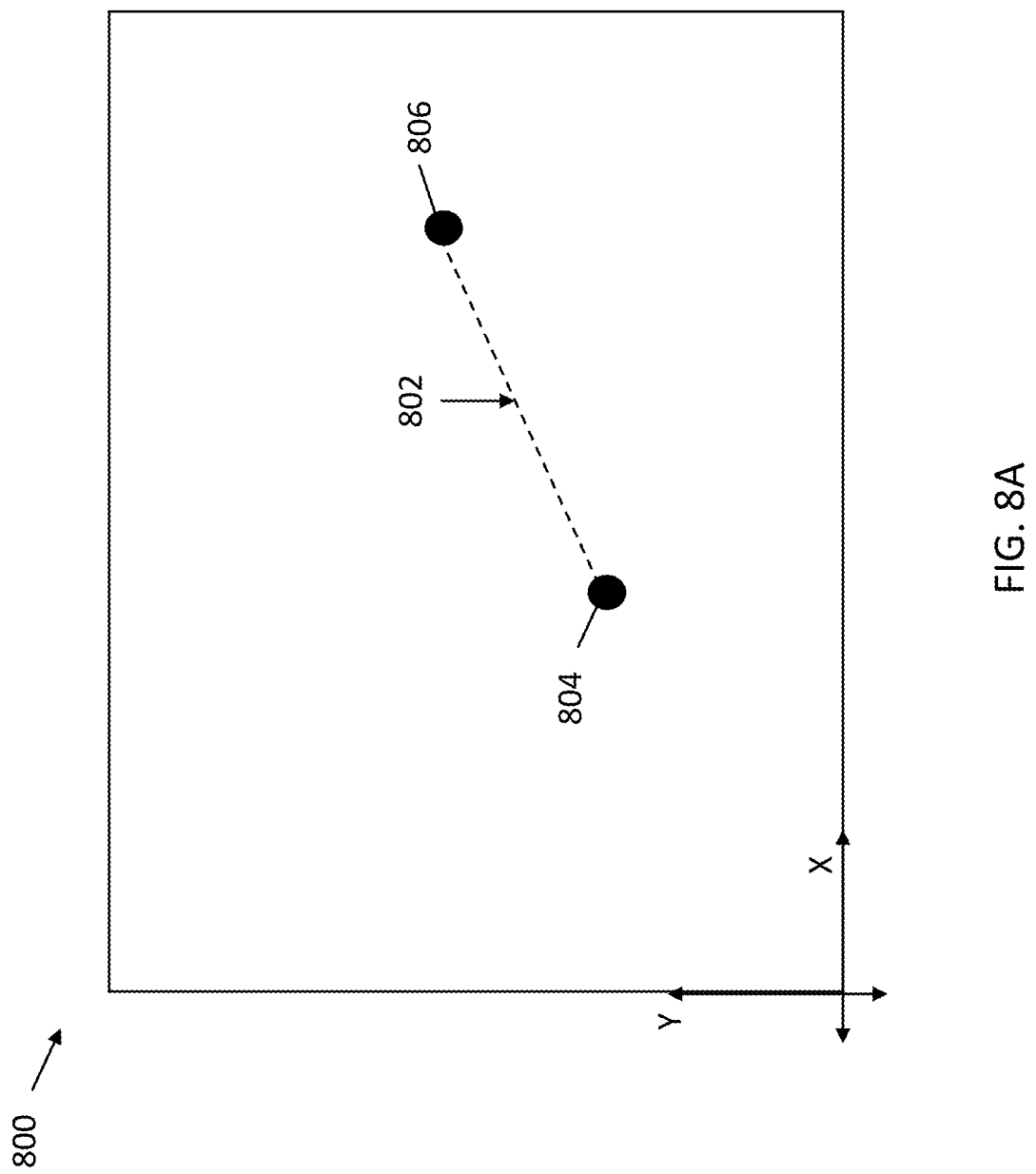

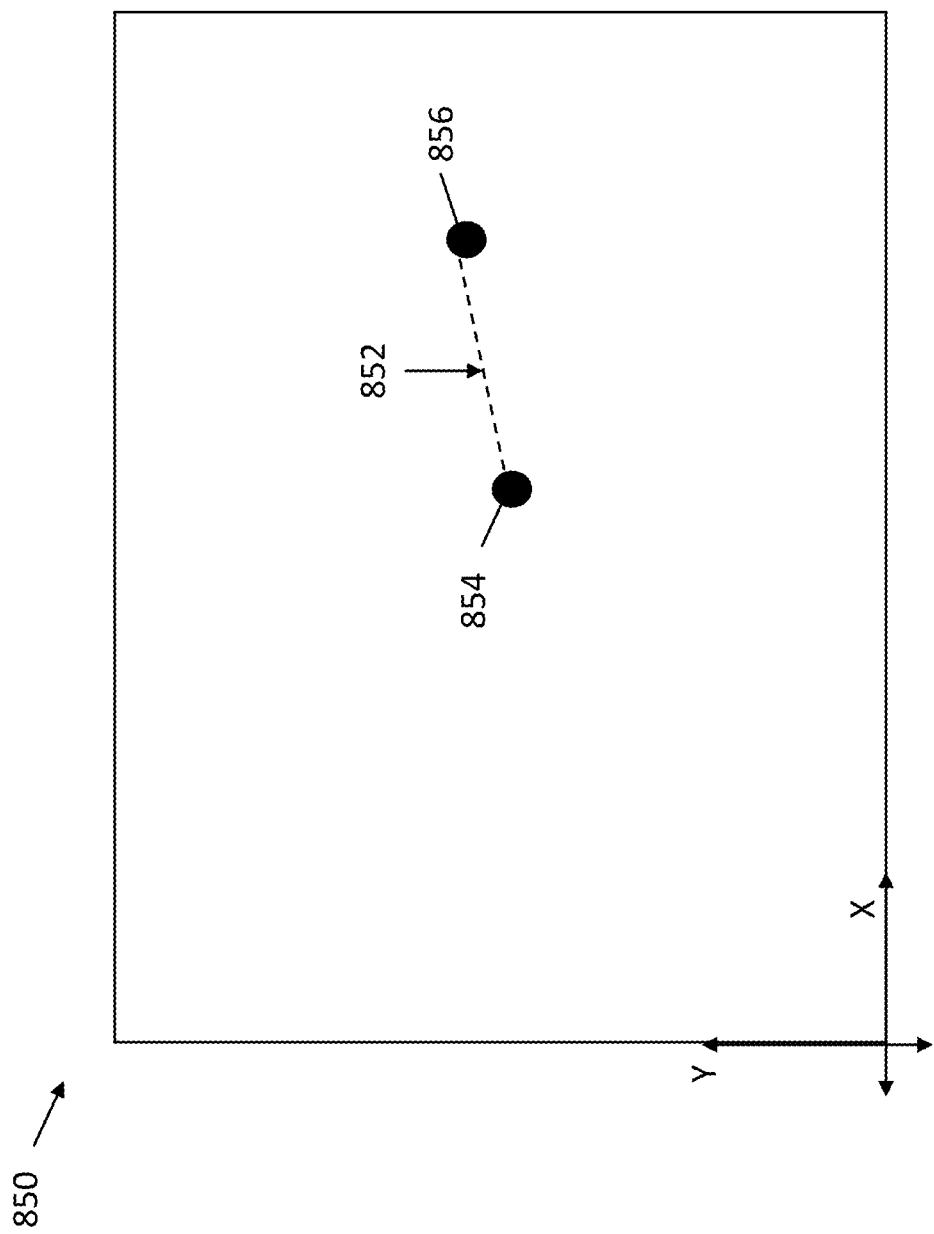

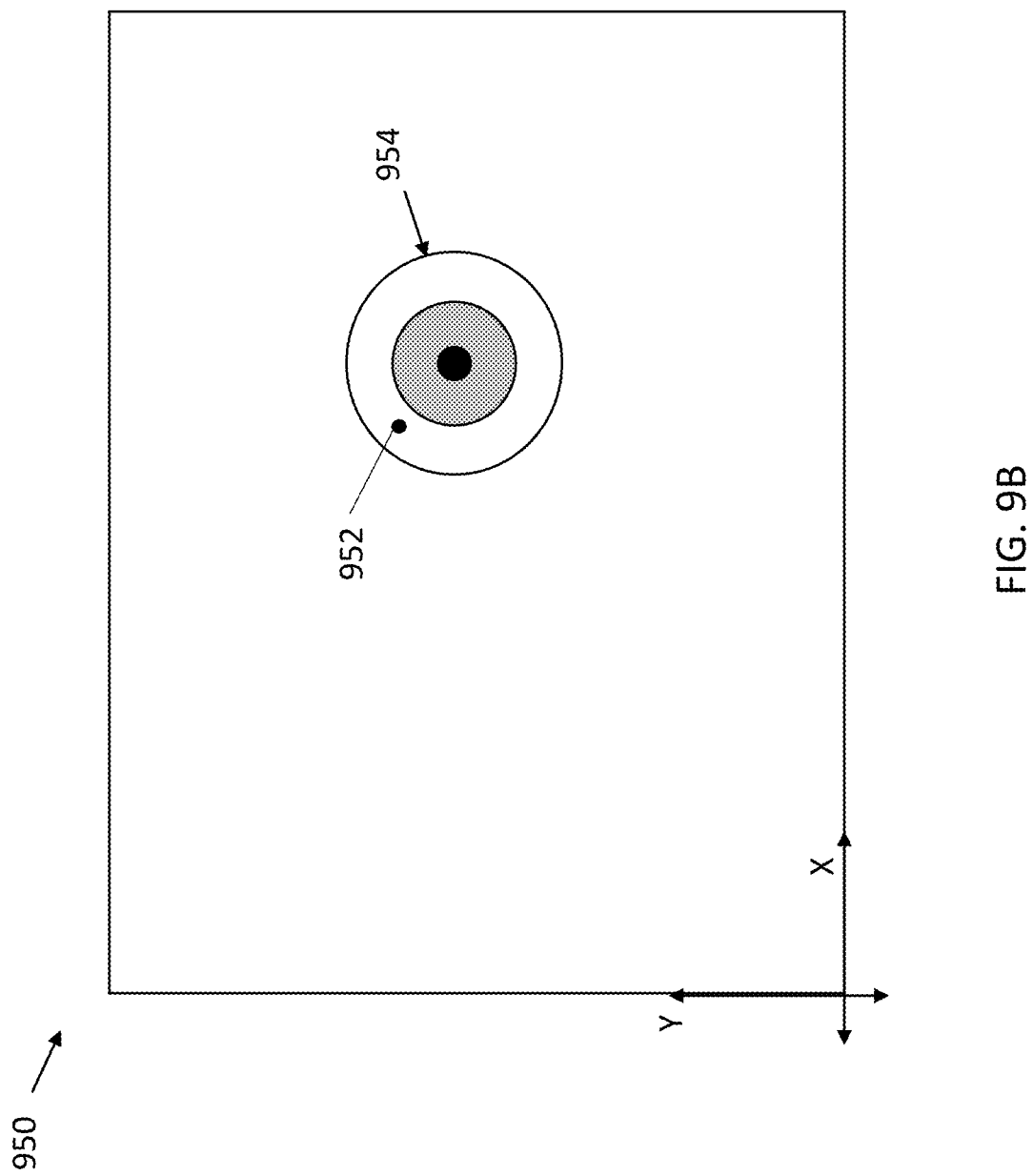

TECHNIQUES FOR VIDEO GAME INPUT COMPENSATION AND RELATED SYSTEMS AND METHODS

CROSS-REFERENCE TO RELATED APPLICATIONS

This application claims the benefit of U.S. Provisional Patent Application No. 62/891,645, filed on Aug. 26, 2019, which is incorporated by reference herein in its entirety.

BACKGROUND

Over the years, various video game platforms have been developed that provide users with a myriad of game play environments. Such environments range from the more traditional environments with two-dimensional displays (e.g., personal computers, laptops, and gaming consoles that connect to a television display) to more recent platforms that provide three-dimensional, augmented reality, and virtual reality experiences. To interact with video game platforms, users typically use one or more input devices, such as a keyboard and mouse, wired and/or wireless controllers, as well as spatially tracked controllers.

Video games often require the player to exhibit a certain amount of skill in order to play the video game well. For example, players may need to time actions with video game content, such as moving a character (e.g., running, jumping, etc.), shooting at a stationary or moving target, playing musical instruments for rhythm-action games, and/or performing other types of actions. In order to perform such actions, the user needs to manipulate the input device accordingly, such as by timing button presses, joystick maneuvers, and/or the like.

SUMMARY

Described herein are embodiments of techniques for improving user experience in a video game. In some embodiments, the techniques utilize one or more snapshots of the video game over time in order to adjust a pose of a user's input device in the video game. For example, the user's input device may be a spatially tracked controller which has a tracked pose in the video game. A user input may indicate a button pressed on the spatially tracked controller (e.g., triggering firing of a shot in the video game). In some embodiments, the techniques use snapshot(s) of the video game that capture instances of the video game prior to the user input to determine a more accurate adjusted pose for the input device. The more accurate adjusted post may then be used in the video game to provide an improved user experience. For example, the video game may more accurately determine whether a shot triggered from the user input hit a target in the video game.

According to one aspect, a computerized method is provided. The method is implemented by a processor in communication with a memory. The memory stores computer-readable instructions that, when executed by the processor, cause the processor to perform: accessing data indicative of a set of snapshots of one or more aspects of a video game over time, wherein each of one or more of the set of snapshots: is associated with a timestamp; and comprises data indicative of: (a) a first pose associated with an input device, and (b) a state of a video game simulation at a time of the snapshot; receiving data indicative of: an input from the input device at a time occurring after one or more timestamps associated with the one or more snapshots; and an initial pose associated with the input device for the input; and determining an adjusted pose for the input based on a relationship, for each snapshot of the one or more snapshots, between (i) the first pose associated with the input device and (ii) the state of the video game simulation at the time of the snapshot.

In one embodiment, the first pose associated with the input device comprises a ray, the ray comprising a position and a direction; and the state of the video game simulation comprises a position of a target. In one embodiment, the one or more snapshots comprise a first snapshot that is associated with a first timestamp, wherein the first timestamp is within (a) a predetermined time period before the time of the input, and/or (b) a predetermined number of snapshots before the time of the input; and the adjusted pose is the first pose associated with the input device of the first snapshot.

In one embodiment, the one or more snapshots comprise a plurality of snapshots and the one or more timestamps comprise a plurality of timestamps, wherein each one of the plurality of snapshots is associated with a respective one of the plurality of timestamps, each of the plurality of timestamps being (a) within a predetermined time period before the time of the input, and/or (b) within a predetermined number of snapshots before the time of the input. In one embodiment, the method further comprises determining, for each of at least some of the plurality of snapshots, a metric based on the first pose associated with the input device and the state of the video game simulation at the time of the snapshot. In one embodiment, the first pose associated with the input device comprises a ray, the ray comprising a position and a direction; the state of the video game simulation comprises a position of a target; and determining the metric for each of the at least some snapshots comprises determining an indication of accuracy of the ray pointing at the position. In one embodiment, determining the adjusted pose comprises: comparing determined metrics for the at least some snapshots to determine a snapshot of the at least some snapshots with a highest metric; and determining the adjusted pose based on the determined snapshot. In one embodiment, determining the adjusted pose based on the determined snapshot with the highest metric comprises determining the adjusted pose to be the first pose of the determined snapshot. In one embodiment, determining the adjusted pose comprises determining the adjusted pose based on the initial pose and the first pose of the determined snapshot. In one embodiment, determining the adjusted pose comprises: comparing the metrics of the at least some snapshots to determine a subset of two or more snapshots of the at least some snapshots with higher metrics than one or more remaining snapshots of the at least some snapshots; and determining the adjusted pose based on the determined subset of two or more snapshots.

In one embodiment, the input device is a spatially tracked controller; and the input is indicative of a button press on the spatially tracked controller. In one embodiment, the state of the video game simulation at the time of the snapshot comprises a second pose associated with a target in the snapshot.

According to another aspect, a non-transitory computer-readable media is provided. The non-transitory computer-readable media comprises instructions that, when executed by one or more processors on a computing device, are operable to cause the one or more processors to execute: accessing data indicative of a set of snapshots of one or more aspects of a video game over time, wherein each of one or more of the set of snapshots: is associated with a timestamp; and comprises data indicative of: a first pose associated with an input device, and a state of a video game simulation at a time of the snapshot; receiving data indicative of: an input from the input device at a time occurring after one or more timestamps associated with the one or more snapshots; and an initial pose associated with the input device for the input; and determining an adjusted pose for the input based on a relationship, for each snapshot of the one or more snapshots, between (i) the first pose associated with the input device and (ii) the state of the video game simulation at the time of the snapshot.

According to one embodiment, the first pose associated with the input device comprises a ray, the ray comprising a position and a direction; and the state of the video game simulation comprises a position of a target.

According to one embodiment, the one or more snapshots comprises a plurality of snapshots, and the instructions further cause the one or more processors to execute: determining a metric for each of at least some of the plurality of snapshots; comparing determined metrics for the at least some snapshots to determine a snapshot of the at least some snapshots with a highest metric; and determining the adjusted pose based on the determined snapshot with the highest metric.

According to one embodiment, the first pose associated with the input device comprises a ray, the ray comprising a position and a direction; the state of the video game simulation at the time of the snapshot comprises a position a target; and determining the metric for each of the at least some snapshots comprises determining an indication of accuracy of the ray pointing at the position.

According to another aspect, a system is provided. The system comprises a memory storing instructions, and a processor configured to execute the instructions to perform: accessing data indicative of a set of snapshots of one or more aspects of a video game over time, wherein each of one or more of the set of snapshots: is associated with a timestamp; and comprises data indicative of: (a) a first pose associated with an input device, and (b) a state of a video game simulation at a time of the snapshot receiving data indicative of: an input from the input device at a time occurring after one or more timestamps associated with the one or more snapshots; and an initial pose associated with the input device for the input; and determining an adjusted pose for the input based on a relationship, for each snapshot of the one or more snapshots, between (i) the first pose associated with the input device and (ii) the second pose associated with the target.

According to one embodiment, the first pose associated with the input device comprises a ray, the ray comprising a position and a direction; and the state of the video game simulation comprises a position of a target. According to one embodiment, the one or more snapshots comprise a first snapshot that is associated with a first timestamp, wherein the first timestamp is within (a) predetermined time period before the time of the input, and/or (b) a predetermined number of snapshots before the time of the input; and the processor is configured to execute the instructions to perform: determining the adjusted pose to be the first pose associated with the input device of the first snapshot.

According to one embodiment, the one or more snapshots comprises a plurality of snapshots, and the processor is configured to execute the instructions to perform: determining a metric for each of at least some of the plurality of snapshots; comparing determined metrics for the at least some snapshots to determine a snapshot of the at least some snapshots with a highest metric; and determining the adjusted post based on the determined snapshot with the highest metric.

According to one embodiment, the first pose associated with the input device comprises a ray, the ray comprising a position and a direction; the state of the video game simulation comprises a position of a target; and determining the metric for each of the at least some snapshots comprises determining an indication of accuracy of the ray pointing at the position.

There has thus been outlined, rather broadly, the features of the disclosed subject matter in order that the detailed description thereof that follows may be better understood, and in order that the present contribution to the art may be better appreciated. There are, of course, additional features of the disclosed subject matter that will be described hereinafter and which will form the subject matter of the claims appended hereto. It is to be understood that the phraseology and terminology employed herein are for the purpose of description and should not be regarded as limiting.

BRIEF DESCRIPTION OF DRAWINGS

Various aspects and embodiments will be described with reference to the following figures. It should be appreciated that the figures are not necessarily drawn to scale. In the drawings, each identical or nearly identical component that is illustrated in various figures is represented by a like numeral. For purposes of clarity, not every component may be labeled in every drawing.

FIGS. 6A-6C are diagrams illustrating exemplary metrics for snapshots of 3D game aspects, according to some embodiments.

FIGS. 8A-8B graphically illustrate a first example of metrics in a 2D space, according to some embodiments.

FIGS. 9A-9B graphically illustrate another example of metrics using a heat map in a 2D space, according to some embodiments.

DETAILED DESCRIPTION

Figure 1:
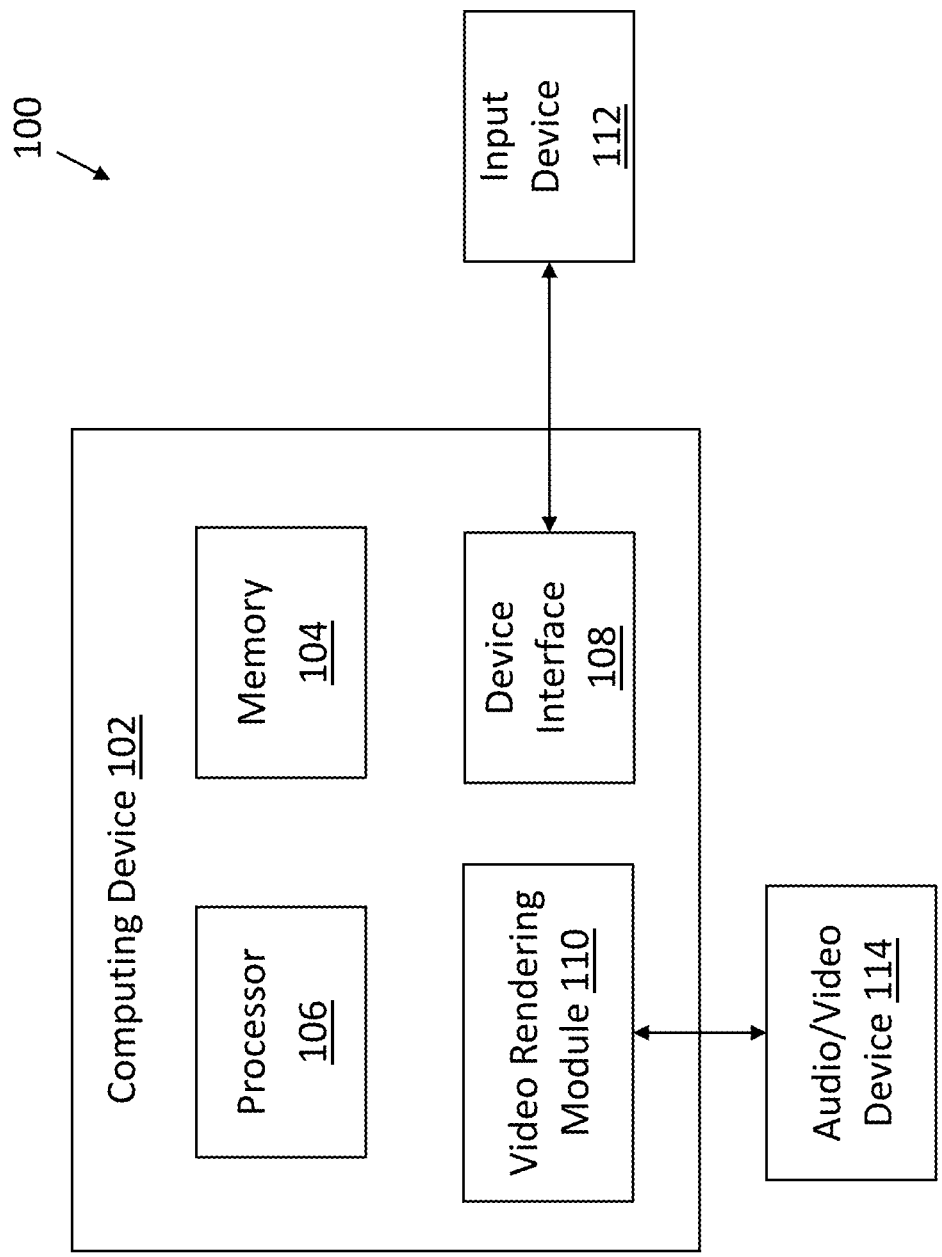
FIG. 1 is a block diagram of a video game platform, according to some embodiments.

The inventor has recognized and appreciated that various aspects of video game play, including aspects related to the video game platform and/or the player's interaction with the platform through input devices, can result in a poor game experience. How the computing device processes user input, potentially in combination with the user's physical interaction with an input device, may result in a poor game experience. For example, a user may intend to provide an input at a particular time during game play and/or in a particular manner with the input device, yet the video game platform processes the user input differently than the user intends. For example, when aiming a weapon in a video game, a common practice is for the user to line up their shot and to pull the trigger at the appropriate time according to game play. While video game platforms are designed to require user skill in order to obtain a successful or unsuccessful shot, the inventor has discovered and appreciated that unintended aspects of video game play may undesirably influence whether the shot is successful. For example, due to how the video game console processes user input, the video game scenario may change in the time between when the user lines up the shot and pulls the trigger. As another example, since spatially tracked controllers can require the user to press a button or to pull a trigger, the act of pulling the trigger can affect the user's aim, such as by unintentionally jerking the controller's pose (which can unintentionally change the user's direction of aim), causing the user to miss the shot.

Therefore, while it can be desirable to require a certain level of skill to play video games, the inventor has discovered and appreciated that such timing issues and/or input device-based issues can confuse players and feel unfair. Similarly, while spatially tracked input devices can improve the user experience by providing an additional level of enjoyment compared to non-spatially tracked controllers, due to the fact that such controllers are often lightweight, pressing buttons can undesirably change the pose of the controller and affect the user's game play. The inventor has also discovered and appreciated that it can be advantageous to augment a user's video game playing abilities, such as improving the player's performance of the game. A user's abilities can be augmented in order to increase a player's enjoyment of the video game. For example, a player's aim can be improved so that the player successfully shoots a target more frequently, which can result in a better user experience.

The inventor has developed improvements to existing video game technology that can enhance the user's gaming experience. The techniques can be used to provide realistic user experiences, in a manner that lines up with the user's perception of their video game play. For example, if a user perceives that their input should be successful (e.g., a successful shot, a successful maneuver, and/or the like), the techniques can be used to provide such a result to increase their enjoyment of the game. In some embodiments, the techniques adjust the user's input and/or other aspects associated with the input (e.g., aim), so that the user's input achieves a result more in-line with the user's perception of their game play. Such techniques can therefore give players the benefit of the doubt of their input, such as by increasing the chances that the user shoots at an intended location.

In some embodiments, rather than processing a user input according to the current time and/or input device characteristics, such as button presses, pose of a tracked controller, aim, etc.), the techniques can adjust the input based on snapshots of prior game play aspects. As an illustrative example, for a shooting-type feature, instead of simply firing at where the user is currently aiming at the time of the trigger pull, the techniques can track snapshots of aspects of video game play over time, such as the history of the user's aim at a target. The techniques can adjust the aim and/or timing of the trigger pull when processing the shot. Such approaches can help the player to shoot at a location that the user was aiming at immediately before pulling the trigger, since pulling the trigger may cause the location aimed at by the user to unintentionally change. In some embodiments, the current video game aspects associated with the input are also analyzed, in the event that the user's input at the current time (and not a historical time) results in the best game play.

In some embodiments, the techniques can adjust aspects of a user input based on a single historical snapshot. For example, the snapshots can be a snapshot that occurred a fixed time in the past (e.g., 15 milliseconds ago, 30 milliseconds ago, etc.) or a predetermined number of snapshots in the past. In some embodiments, the user input can be adjusted to use one or more aspects of the historical snapshot instead of the actual data associated with the user input. For example, to adjust for timing delays associated with a user input, the video game platform can use previous data from the snapshot, such as a previous aiming location, a previous pose of the input device (e.g., for tracked controllers), and/or the like.

In some embodiments, the techniques can adjust aspects of a user input based on a plurality of historical snapshots of game play. For example, the techniques can analyze the set of historical snapshots and adjust aspects of the user input based on one or a combination of the historical snapshots. In some embodiments, the techniques can determine a metric for each of the historical snapshots that is indicative of a success or failure of the user's input. For example, the metric can indicate as how close a shot would land near a target, how well the shot would score based on a heat map of the target, and/or the like. The video game platform can analyze the metrics of the historical snapshots and select one or more snapshots based on the metrics. For example, the techniques can select the historical snapshot with the best metric, select the two or more historical snapshots with the best metrics, and/or the like. The techniques can then adjust aspects of the game play based on the selected snapshot(s). In some embodiments, the video game platform can use aspects of a snapshot with the best metric instead of the aspects associated with the input. For example, the video game platform can use the aim of the snapshot with the best metric to fire from, instead of the aim associated with the button press or trigger pull. As another example, the techniques can adjust the aim associated with the input based on the aim of the snapshot with the best metric.

Following below are more detailed descriptions of various concepts related to, and embodiments of, techniques for player aiming assist. It should be appreciated that various aspects described herein may be implemented in any of numerous ways. Examples of specific implementations are provided herein for illustrative purposes only. In addition, the various aspects described in the embodiments below may be used alone or in any combination, and are not limited to the combinations explicitly described herein.

FIG. 1 is a block diagram of a platform 100 in accordance with some embodiments. The platform 100 can include a computing device 102. In some embodiments, the computing device 102 can be a dedicated game console, e.g., PLAYSTATION®3, PLAYSTATION®4, or PLAYSTATION®VITA manufactured by Sony Computer Entertainment, Inc.; WII™, WII U™, NINTENDO 2DS™, NINTENDO 3DS™, or NINTENDO SWITCH™ manufactured by Nintendo Co., Ltd.; or XBOX®, XBOX 360®, or XBOX ONE® manufactured by Microsoft Corp. In some embodiments, the computing device 102 can be a computer configured to run a virtual reality (VR) platform, such as those provided by Oculus, HTC, Sony, and/or the like, and discussed further herein. In other embodiments, the computing device 102 can be a general purpose desktop or laptop computer. In other embodiments, the computing device 102 can be a server connected to a computer network. In other embodiments, the computing device 102 can be user equipment. The user equipment can communicate with one or more radio access networks and/or with wired communication networks. The user equipment can be a cellular phone. The user equipment can also be a smartphone providing services such as word processing, web browsing, gaming, and/or the like. The user equipment can also be a tablet computer providing network access and most of the services provided by a smart phone. The user equipment can operate using an operating system such as Symbian OS, iPhone OS, RIM's Blackberry, Windows Mobile, Linux, HP WebOS, and Android. The screen might be a touch screen that is used to input data to the mobile device, in which case the screen can be used instead of the full keyboard. The user equipment can also keep global positioning coordinates, spatial positioning information (e.g., roll, pitch, yaw, etc.), profile information, or other location information.

The computing device 102 can include a memory device 104, a processor 106, a video rendering module 108, and a device interface 110. While connections between the components of the computing device 102 are not shown in FIG. 1 for ease of illustration, it should be appreciated that the components can be interconnected in various ways to facilitate communication among the components.

The non-transitory 104 can maintain machine-readable instructions for execution on the processor 106. In some embodiments, the memory 104 can take the form of volatile memory, such as Random Access Memory (RAM) or cache memory. In other embodiments, the memory 104 can take the form of non-volatile memory, including by way of example semiconductor memory devices, e.g., EPROM, EEPROM, and flash memory devices; or magnetic disks, e.g., internal hard disks or removable disks. In some embodiments, the memory 104 can include portable data storage devices, including, for example, magneto-optical disks, and CD-ROM and DVD-ROM disks.

The processor 106 can take the form of a programmable microprocessor executing machine-readable instructions, such as a computer processing unit (CPU). Alternatively, the processor 106 can be implemented at least in part by special purpose logic circuitry, e.g., an FPGA (field programmable gate array) or an ASIC (application-specific integrated circuit) or other specialized circuit. The processor 106 can include a plurality of processing units, each of which may independently operate on an input data, such as a gradient vector. In some cases, the plurality of processing units may be configured to perform an identical operation on different data. For example, the plurality of processing units can be configured in a single-instruction-multiple-data (SIMD) architecture to operate on multiple data using a single instruction. In other cases, the plurality of processing units may be configured to perform different operations on different data. For example, the plurality of processing units can be configured in a multiple-instruction-multiple-data (MIMD) architecture to operate on multiple data using multiple instructions.

The processor 106 can be coupled with a device interface 108. The device interface 108 can be implemented in hardware to send and receive signals in a variety of mediums, such as optical, copper, and wireless, and in a number of different protocols some of which may be non-transient.

The device interface 108 can be coupled with an external input device 112. The external input device 112 can allow a player to interact with the computing device 102. In some embodiments, the external input device 112 can include a game console controller, a mouse, a keyboard, or any other device that can provide communication with the computing device 102. In some embodiments, the external input device 112 can be one or more spatially tracked controllers that are configured to work with a VR headset, such as the Oculus Rift, HTC Vive, Sony PlayStation VR, and/or the like. Examples of such spatially tracked controllers include motion controllers, wired gloves, 3D mice, and/or the like. For example, the spatially tracked controllers can be tracked using optical tracking systems, such as infrared cameras and/or the like.

In some embodiments, the processor 106 can be coupled to a video rendering module 110. The video rendering module 110 can be configured to generate a video display on the external audio/visual device 114 based on instructions from processor 106. While not shown, the computing device 102 can also include a sound synthesizer that can be configured to generate sounds accompanying the video display.

The external audio/visual device 114 can be a video device, an audio device, or an audio/video device, and can include one or more audio and/or video devices. In some embodiments, the one or more audio/video devices can include a display device, e.g., a CRT (cathode ray tube), LCD (liquid crystal display) monitor, or LED (light emitting diode) monitor, a television, an integrated display, e.g., the display of a PLAYSTATION®VITA or Nintendo 3DS, or other type of device capable of displaying video and accompanying audio sounds. In some embodiments, the external audio/visual device 114 is a VR headset, such as the Oculus Rift, HTC Vive, Sony PlayStation VR, and/or other VR headsets. Such VR headsets can include motion sensing devices, such as gyroscopes and/or other motion sensors that track the user's motion (e.g., the user's head, hand, or body). Such VR headsets can also include display screens. Such VR headsets can also include on board processors that are used to process motion data, display VR video, and perform other aspects of the VR environment.

While FIG. 1 shows one connection into the one or more audio/video devices 114, other embodiments two or more connections are also possible, such as a connection to a video device and a separate connection to an audio device (e.g., speakers or a headset). In some embodiments, one of the audio/video devices 114 can reside in a first system (e.g., a display system) and another one of the audio/video devices 114 can reside in second system (e.g., a sound system).

In some embodiments, one or more of the modules 108, 110, and/or other modules not shown in FIG. 1, can be implemented in software using the memory device 104. The software can run on a processor 106 capable of executing computer instructions or computer code. The processor 106 is implemented in hardware using an application specific integrated circuit (ASIC), programmable logic array (PLA), digital signal processor (DSP), field programmable gate array (FPGA), or any other integrated circuit. The processor 106 suitable for the execution of a computer program includes, by way of example, both general and special purpose microprocessors, digital signal processors, and any one or more processors of any kind of digital computer. Generally, the processor 106 receives instructions and data from a read-only memory or a random access memory or both.

In some embodiments, one or more of the modules (e.g., modules 108, 110, and/or other modules) can be implemented in hardware using an ASIC (application-specific integrated circuit), PLA (programmable logic array), DSP (digital signal processor), FPGA (field programmable gate array), or other integrated circuit. In some embodiments, two or more modules can be implemented on the same integrated circuit, such as ASIC, PLA, DSP, or FPGA, thereby forming a system on chip. Subroutines can refer to portions of the computer program and/or the processor/special circuitry that implement one or more functions.

The various modules of the computing device 102 can be implemented in digital electronic circuitry, or in computer hardware, firmware, software, or in combinations of them. The implementation can be as a computer program product, e.g., a computer program tangibly embodied in a machine-readable storage device, for execution by, or to control the operation of, a data processing apparatus, e.g., a programmable processor, a computer, and/or multiple computers. A computer program can be written in any form of computer or programming language, including source code, compiled code, interpreted code and/or machine code, and the computer program can be deployed in any form, including as a stand-alone program or as a subroutine, element, or other unit suitable for use in a computing environment. A computer program can be deployed to be executed on one computer or on multiple computers at one or more sites.

While the modules 108 and 110 are depicted as separate modules outside of processor 106 (e.g., as stand-alone graphics cards or sound cards), other embodiments are also possible. For example, one or both modules can be implemented as specialized hardware blocks within processor 106. Alternatively, one or more modules 108 and 110 can be implemented purely as software running within processor 106.

Generally, the techniques provide for adjusting aspects of video game play based on historical game play data. In some embodiments, the techniques adjust aspects associated with a user input, such as the timing of a user input, an aim and/or location associated with the user's input, and/or the like, based on historical snapshots of those aspects over time. Some examples discussed herein provide for adjusting the pose associated with the input (e.g., a 2D position, a 3D position, a ray or vector that includes both a position and a direction, and/or the like) in order to adjust the user's aim for a shot. However, this is for exemplary purposes only, as the techniques can be used to adjust any aspect of game play that can be tracked over time, such as the timing of the input, the position of the characters, obstacles, terrain, and/or the like.

Figure 2:
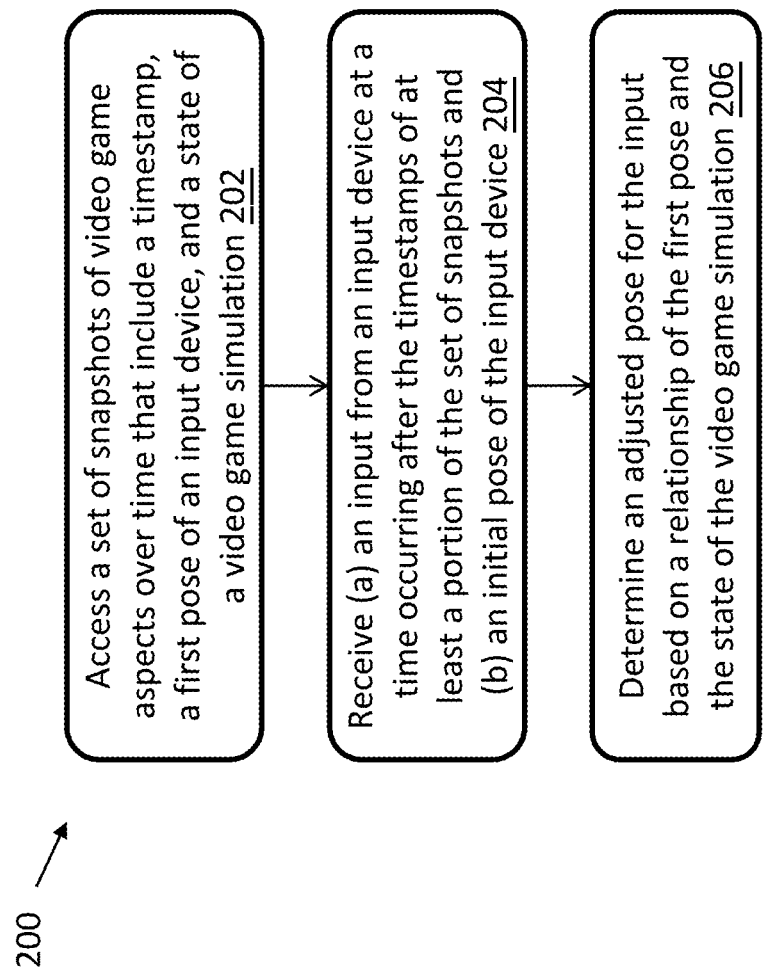
FIG. 2 is a flow chart showing an exemplary computerized method for determining an adjusted pose of an input device for an associated input, according to some embodiments.

FIG. 2 is a flow chart showing an exemplary computerized method 200 for determining an adjusted pose of an input device (e.g., aim) for an associated input (e.g., a button press or trigger pull), according to some embodiments. As described herein, the method 200 can be executed by a video game platform, such as by the video game platform 100 described in conjunction with FIG. 1. At step 202, the video game platform can access data indicative of a set of snapshots of one or more aspects of a video game over time. Each snapshot can be associated with a timestamp that is indicative of when the aspects of the game play occurred. Each snapshot can include data for various game play aspects, including data indicative of a first pose associated with an input device, and a state of a video game simulation at a time of the snapshot. In some embodiments, the state of the video game simulation may be a second pose associated with a target. For example, the second pose can be the location of a target that the user is aiming at using the first pose of the input device. In some embodiments, the state of the video game simulation may be poses of multiple targets. For example, the poses can be locations of multiple targets that a user is aiming at using the first pose of the input device. In some embodiments, the state of the video game simulation may be a parameter indicating characteristics of an environment in the simulation. For example, the state of the video game simulation may be and/or include geometrical aspects (e.g., dimension(s), angle(s), etc.) of a terrain. In another example, the state of the video game simulation may be and/or include wind speed and/or turbulence in the environment of the simulation at the time of the snapshot. Some embodiments are not limited to indications of the state of the video game simulation described herein.

Figure 3:
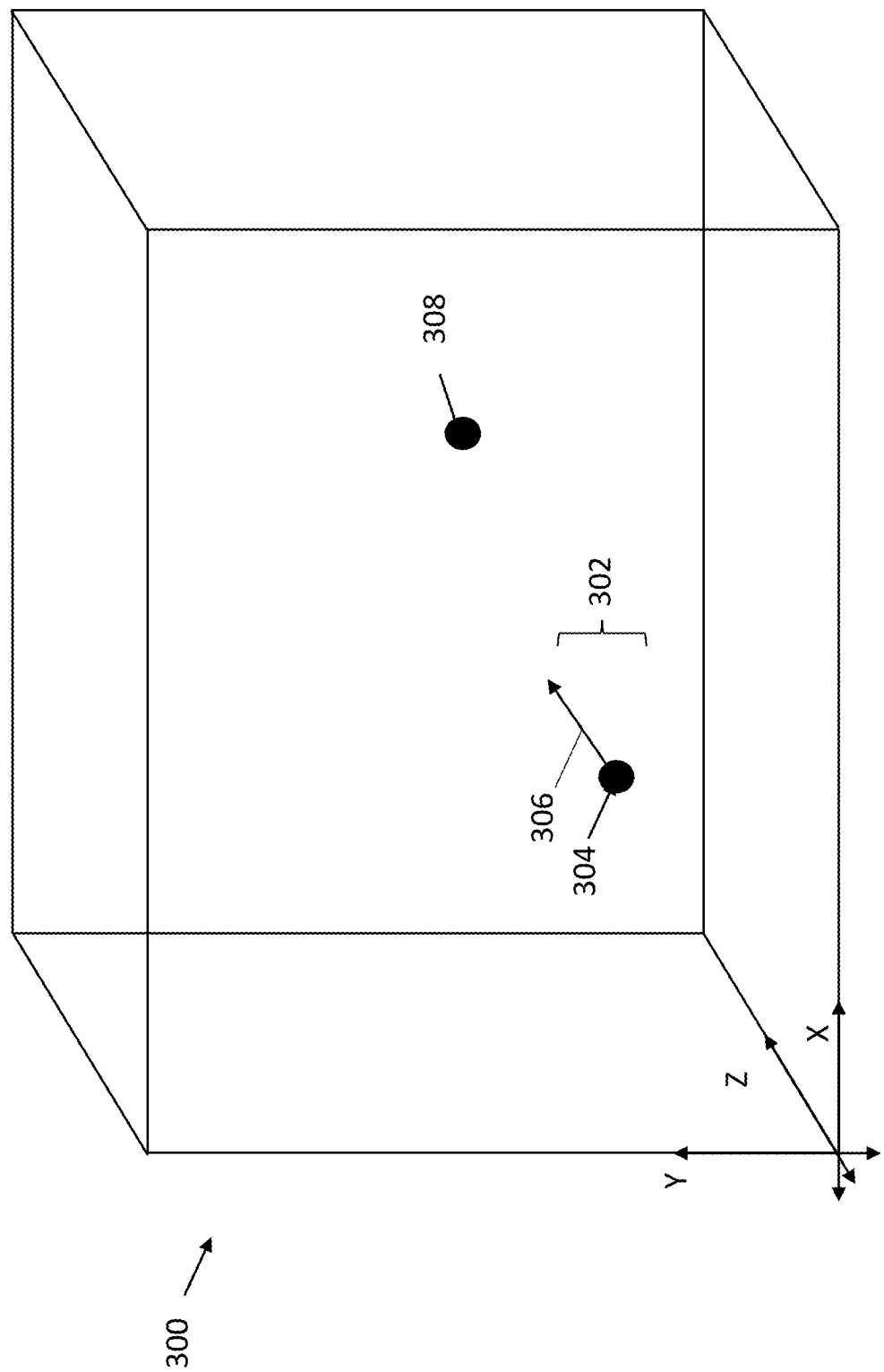
FIG. 3 is a graphical depiction of an exemplary snapshot of 3D video game aspects, according to some embodiments.
Figure 4:
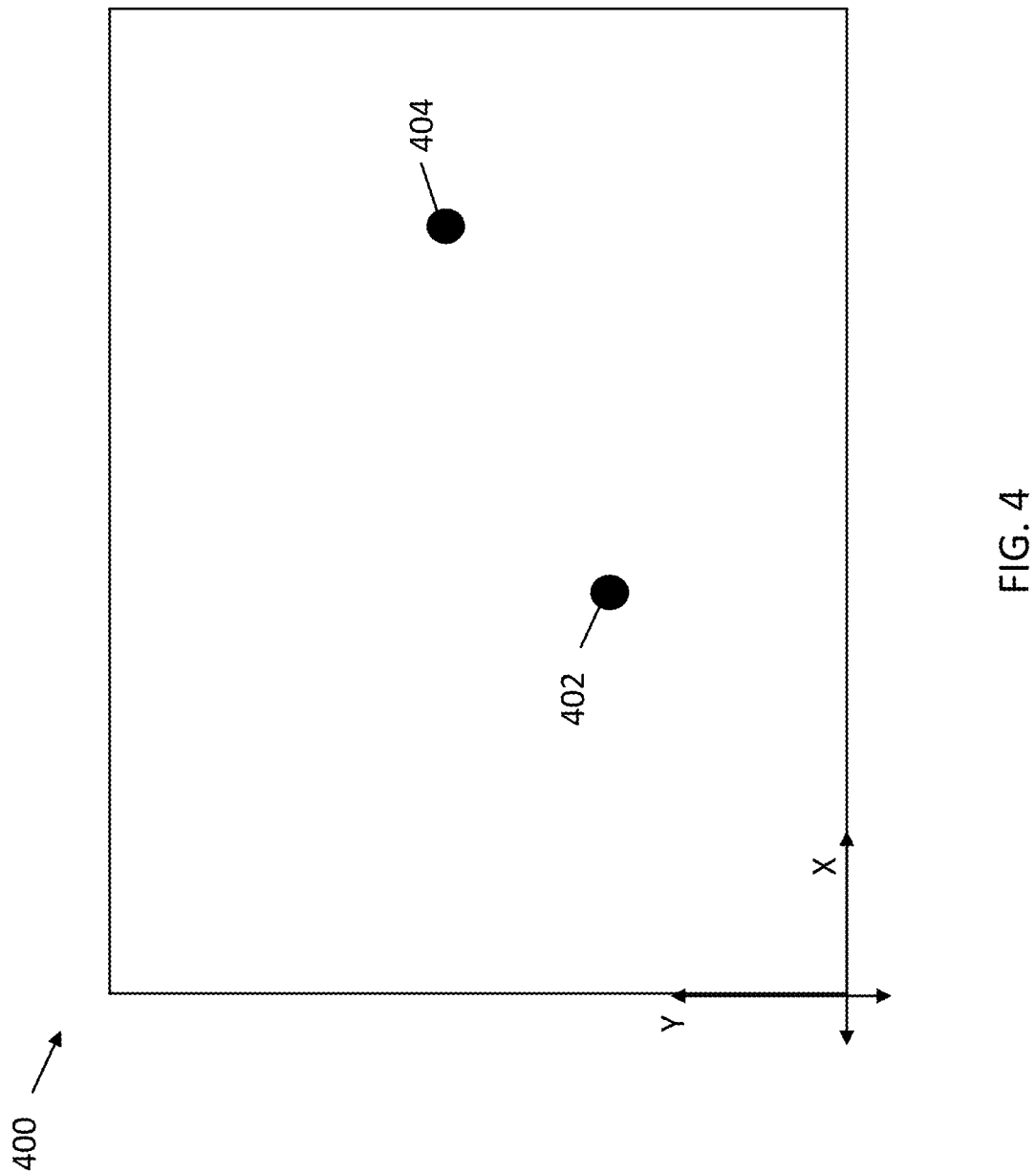
FIG. 4 is a graphical depiction of an exemplary snapshot of 2D video game aspects, according to some embodiments.

FIGS. 3-4 are graphical depictions showing aspects of video game play that can be tracked by the snapshots. FIG. 3 is a graphical depiction of an exemplary snapshot 300 of 3D video game aspects, according to some embodiments. The snapshot 300 includes a first pose 302, which is a ray that includes a 3D position 304 of the input device (e.g., a position of a tracked VR controller) as well as a direction 306 that the controller is pointing (e.g., represented by a second 3D coordinate). The snapshot 300 also includes an indication of a state of a video game simulation at a time of the snapshot (e.g., a second pose) 308. For example, the indication of the video game simulation may be a 3D position of the target. While the indication of the pose 308 in FIG. 3 is shown as a 3D point, this is for exemplary purposes, as the target may include a 2D and/or 3D component and/or other indication. Examples of video game simulation states that may be indicated in a snapshot are described herein.

FIG. 4 is a graphical depiction of an exemplary snapshot 400 of 2D video game aspects, according to some embodiments. The snapshot 400 includes a first pose 402, which is a 2D position associated with the input device, such as a position in the video game indicating the user's aim at the time of the snapshot. The snapshot 400 also includes an indication of a state of a video game simulation (e.g., a second pose) 404, which is a 2D position associated with the target. As noted in conjunction with FIG. 3, while the pose 404 of the target is shown as a 2D position, the target can comprise a 2D shape (e.g., which is related to the 2D position).

In some embodiments, the video game platform can be configured to store and/or access one or a plurality of snapshots. For example, the video game platform can be configured to store and/or access just a single snapshot, such as the snapshot that is associated with a timestamp within a predetermined time period before the time of the input, such as a snapshot that is 50 milliseconds, 100 milliseconds, etc. prior to the time of the input. As another example, the video game platform can be configured to store and/or access a single snapshot that is the snapshot that is a predetermined number of snapshots before the time of the input, such as five snapshots before the input, ten snapshots before the input, etc. In some embodiments, the video game platform can be configured to store and/or access a plurality of snapshots. For example, the video game console can be configured to store some or all of the snapshots that occur within a predetermined time period before the time of the input (e.g., 50 milliseconds, 100 milliseconds, etc.). As another example, the video game console can be configured to store some or all of the snapshots that are within a predetermined number of snapshots before the time of the input (e.g., 5 snapshots, 10 snapshots, etc.).

At step 204, the video game platform receives data indicative of an input (e.g., a button press, trigger pull, etc.) from the input device at a time that occurs after the timestamps associated with at least a portion of the set of snapshots. The video game platform also receives data indicative of an initial pose associated with the input device for the input Like the data of gameplay aspects in the snapshots, the pose of the input device can be an associated 2D position in the video game and/or 3D position in the video game (e.g., representative of a position on the screen, as discussed in conjunction with FIG. 4). In some embodiments, the pose of the input device can be a ray that indicates a position of the input device in the video game space, as well as a direction that the input device is pointing in the video game space (e.g., as discussed in conjunction with FIG. 3). For example, the video game platform can determine such rays for tracked VR controllers.

At step 206, the computing device determines an adjusted pose for the input based on a relationship for each snapshot that is determined based on the first pose associated with the input device and the state of the video game simulation (e.g., a second pose of the target). In some embodiments, as described herein the set of snapshots may only include one snapshot as described herein. The video game platform can determine an adjusted pose for the input by instead using the pose associated with the input device in the first snapshot and/or by adjusting the initial pose based on the pose in the first snapshot.

In some embodiments, as also described herein, the set of snapshots may include a plurality of snapshots. The techniques can include analyzing the plurality of snapshots to determine which snapshot(s) to use to determine the adjusted pose. In some embodiments, the video game platform can determine, for each snapshot, a metric based on the video game aspects in the snapshot. In some embodiments, the video game platform can determine the metric based on (1) the first pose associated with the input device and (2) a state of a video game simulation at a time of the snapshot. For example, the metric can be determined based on a pose associated with the input device and a pose associated with the target in the snapshot. In another example, the metric can be determined based on the pose associated with the input device and poses of multiple targets. In another example, the metric can be determined based on the pose associated with the input device and the geometry of a terrain in the video game simulation. In another example, the metric can be determined based on the pose associated with the input device and wind conditions (e.g., speed and turbulence) in the video game simulation. In some embodiments, a combination of multiple aspects of the state of the video game simulation as described herein can be used to determine the metric.

Figure 5:
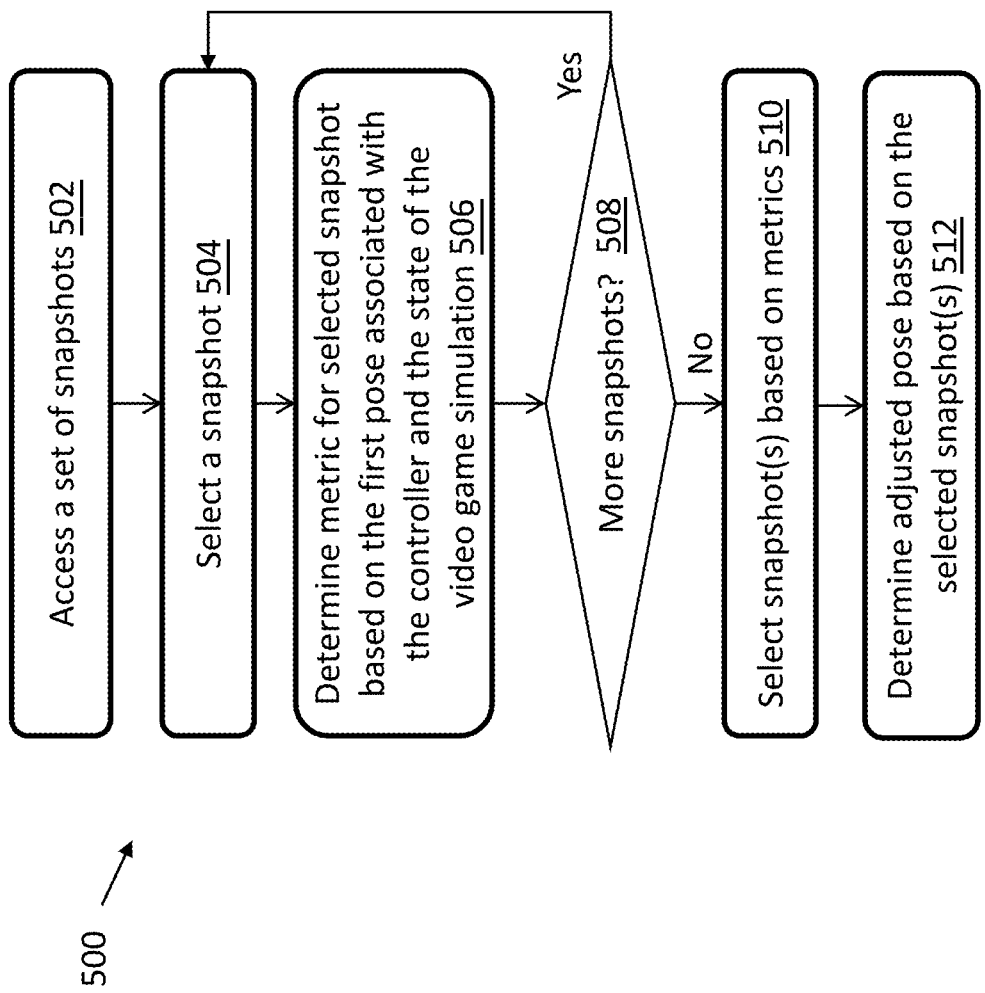
FIG. 5 is a flowchart of an exemplary computerized method for determining a metric for a set of snapshots and processing the snapshots based on the metrics to determine and adjusted pose for an input device, according to some embodiments.

FIG. 5 is a flowchart of an exemplary computerized method 500 for determining a metric for a set of snapshots, according to some embodiments. At step 502, the video game platform accesses a set of a plurality of snapshots. At step 504, the video game platform selects one of the snapshots from the set. At step 506, the video game platform determines a metric for the selected snapshot based on the first pose associated with the controller and a state of a video game simulation (e.g., a second pose associated with the target) at the time of the snapshot. At step 508, the video game platform determines whether there are more snapshots left. If yes, the method proceeds back to step 504, otherwise the method proceeds to step 510 and selects one or more snapshots based on the metrics. At step 512, the video game platform determines the adjusted pose based on the selected snapshot(s).

Figure 6A:
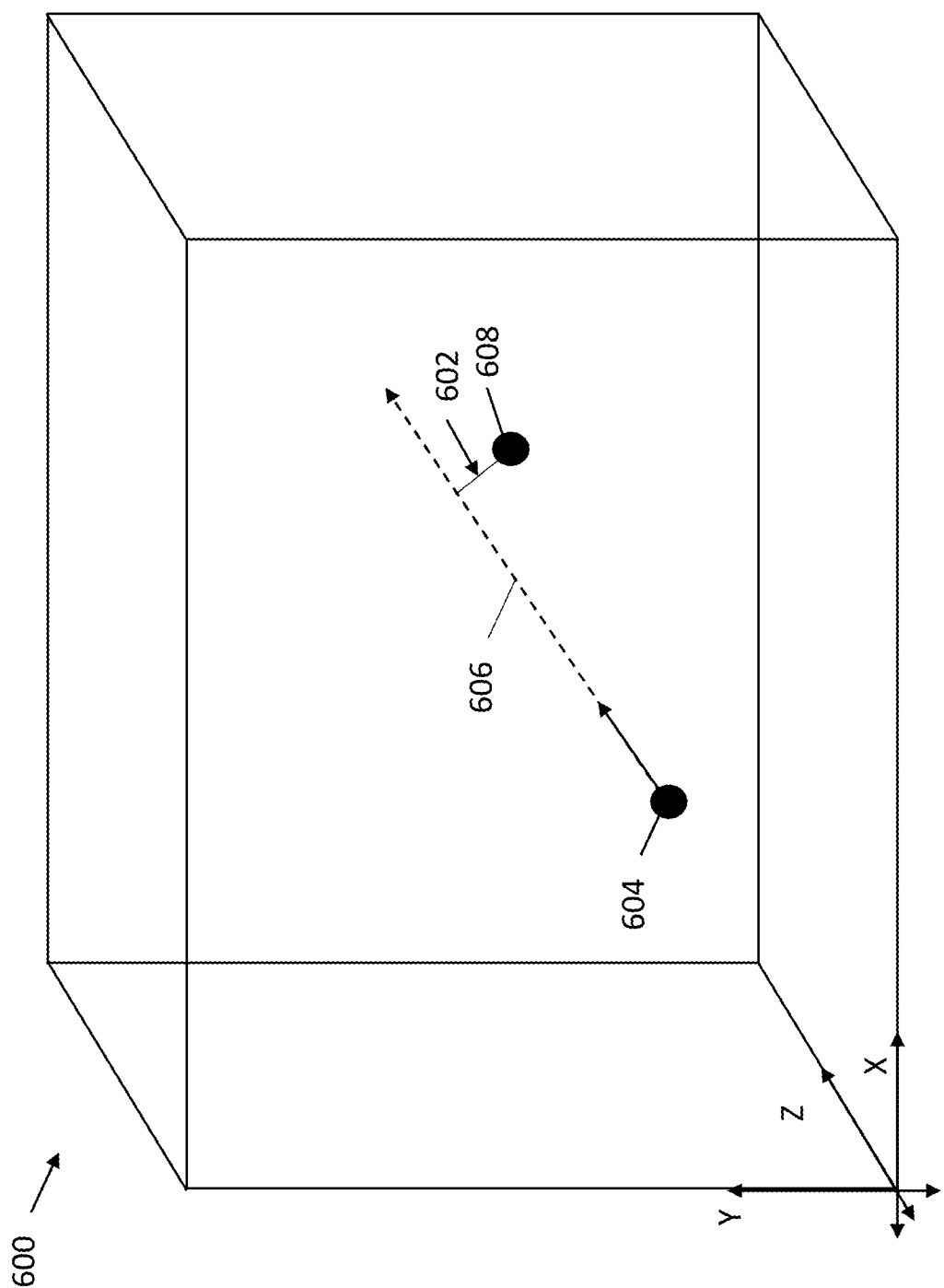

Referring to step 506, the metric can reflect a fitness of different aspects of the snapshot, such as a fitness indicating how well the user is aiming at a target. Continuing with the example discussed in FIG. 2, the metric can reflect, for each snapshot, an accuracy of the first pose associated with the input device to the state of the video game simulation (e.g., the second pose of the target). FIGS. 6A-6C are diagrams illustrating exemplary metrics for snapshots of 3D game aspects, according to some embodiments. FIG. 6A graphically illustrates a first metric 602 for a first snapshot 600, according to some embodiments. The first pose 604 associated with the input device comprises a ray comprising a position and a direction. For illustrative purposes, the ray is extended using dotted arrow 606 to pictorially illustrate the user's aim in the 3D data. The second pose 608 is associated with the target and includes a 3D position, as shown. The metric 602 indicates a fitness of how well the ray 604 associated with the input device is pointing at the pose 608 of the target. As shown in FIG. 6A, the metric 602 is indicated with a line between the dotted line 606 (showing the user's aim in the 3D space) and the pose 608. The metric can be indicative of, for example, a distance between the user's aim and the target 608.

FIG. 6B graphically illustrates a second metric 632 for a second snapshot 630, according to some embodiments. Similar to the first snapshot 600, the snapshot 630 includes a first pose 634 associated with the input device, which is extended using dotted arrow 636 to pictorially illustrate the user's aim in the 3D data. The second snapshot 630 also includes a second pose 638 that is associated with the target. Compared to the first snapshot 600, the metric 632 is larger than the metric 602, which indicates that the second snapshot 630 has a worse metric than the first snapshot 600.

FIG. 6C graphically illustrates a third metric 662 for a third snapshot 660, according to some embodiments. Like the first and second snapshots 600, 630, the third snapshot 660 includes a first pose 664 associated with the input device, which is extended using dotted arrow 666, and a second pose 668 that is associated with the target. Compared to the first snapshot 600 and the second snapshot 630, the metric 662 is smaller than both metrics 602 and 632, which indicates that the third snapshot 660 has the best metric of the three snapshots.

Figure 7A:
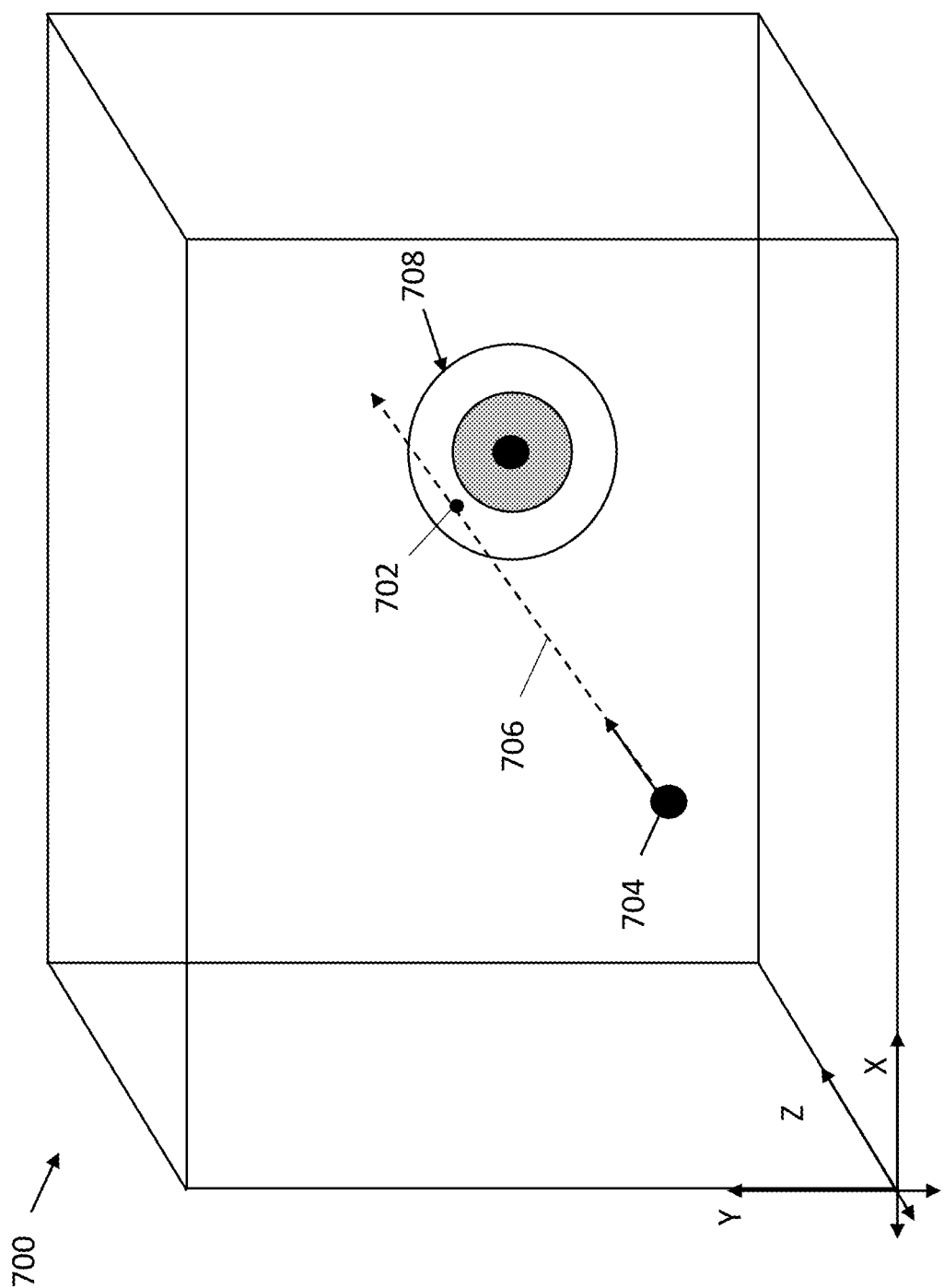
FIGS. 7A-7B graphically illustrate a metric computed for 3D data using a heat map, according to some embodiments.
Figure 7B:
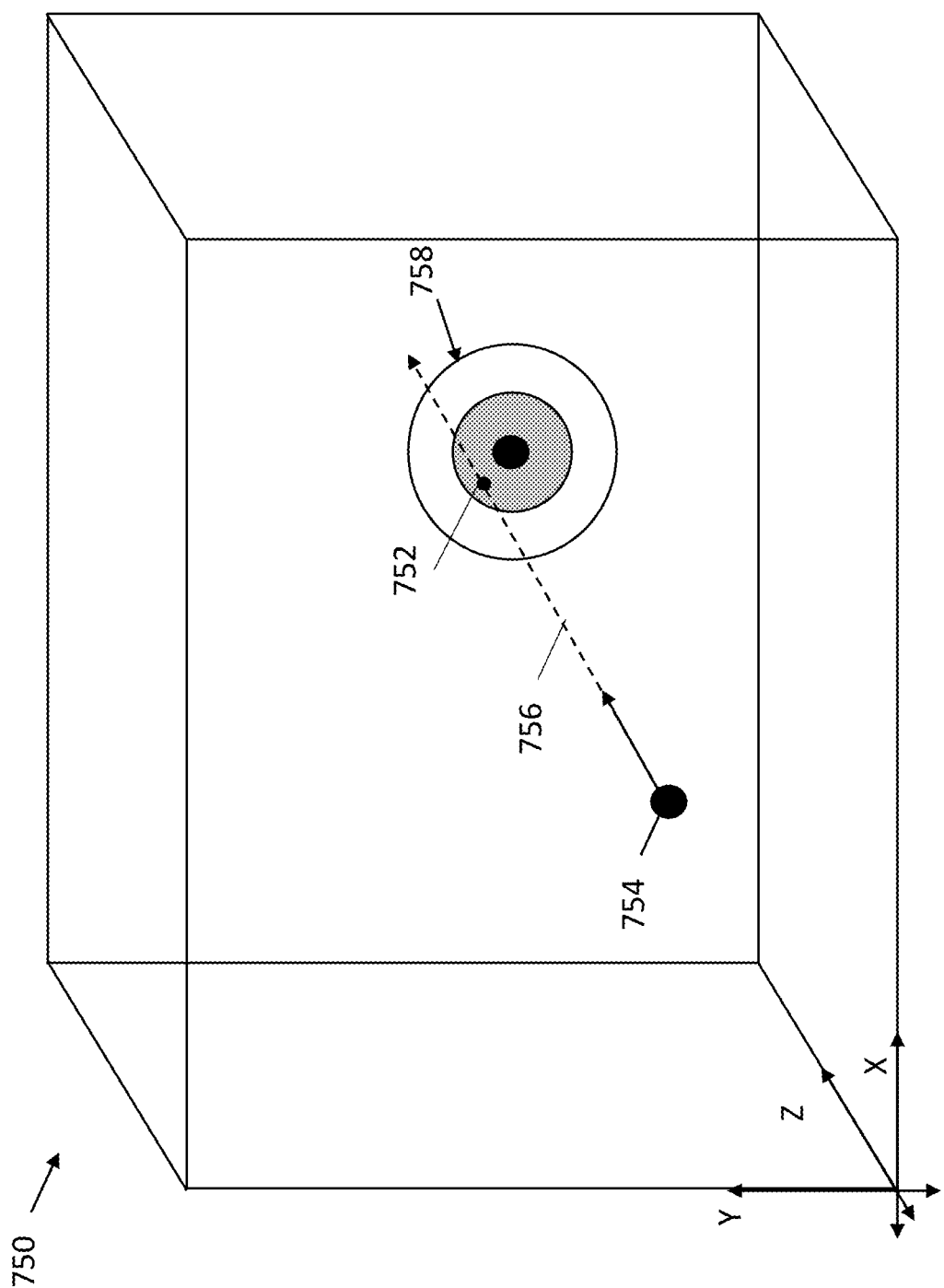

FIGS. 7A-7B graphically illustrate a metric computed for 3D data using a heat map, according to some embodiments. For example, in shooting games, the heat map can be used to determine the effectiveness of a shot for multiple shots that hit the target at different locations. For ease of illustration, the heat map is shown as a bullseye-type structure, where the center-most portion achieves a highest score, the middle portion achieves a middle score, and the outermost portion achieves a lowest score. A person of skill can appreciate that various shapes and/or configurations of heat maps can be used with different structures without departing from the spirit of the invention.

FIG. 7A graphically illustrates a first metric 702 for a first snapshot 700, according to some embodiments. The first pose 704 associated with the input device comprises a ray, which is extended using dotted arrow 706 to pictorially illustrate the user's aim in the 3D data. The second pose 708 is associated with the target and includes at heat map. The metric 702 indicates a fitness of how well the ray 704 associated with the input device is pointing at the target. In particular, as shown in FIG. 7A, the user's aim as indicated by the pose 704 would result in a shot of the outermost ring of the heat map 708. The metric can be indicative of, for example, a successful shot of the lowest score, since shots within the middle and/or center portions of the heat map will score higher than shots in the outermost portion of the heat map.

FIG. 7B graphically illustrates a second metric 752 for a second snapshot 750, according to some embodiments. Like the snapshot 700, the second snapshot 750 includes a first pose 754 associated with the input device, which is extended using dotted arrow 756, and a second pose 758 that is associated with the target heat map. Compared to the first snapshot 700, the metric 752 will score higher than metric 702, since metric 752 indicates the shot is within the center portion of the heat map, which will score better than the metric 702. It should be appreciated that while the metrics 702, 752 are illustrated as points in the heat map, the metric can be stored as a number representing the score of the shot based on the heat map, and/or can be represented in other manners without departing from the spirit of the techniques described herein.

While FIGS. 6A-6C and 7A-7B illustrate snapshots for 3D data (e.g., for VR applications), it should be appreciated that the techniques are not limited to 3D data and/or can be processed so that the metric is computed in a non-3D manner. FIGS. 8A-8B graphically illustrate a first example of metrics in a 2D space, according to some embodiments. FIG. 8A graphically illustrates a first metric 802 for a first snapshot 800, according to some embodiments. The first pose 804 associated with the input device and the second pose 806 associated with the target are both 2D positions. The metric 802 indicates an accuracy of the pose 804 associated with the input device pointing at the target indicated by the pose 806. In particular, as shown in FIG. 7A, the user's aim as indicated by the pose 804 would result in a shot with a distance from the second pose 806 shown by the line of the metric 802. The metric can be indicative of, for example, a distance between the first pose 804 and the second pose 806.

FIG. 8B graphically illustrates a second metric 852 for a second snapshot 850, according to some embodiments Like the first snapshot 800, the first pose 854 associated with the input device and the second pose 856 associated with the target are both 2D positions. The metric 852 indicates a fitness of how well the pose 804 associated with the input device is pointing at the target indicated by the pose 806. In particular, the distance shown by metric 852 is shorter than that shown by metric 802 in FIG. 8B, and therefore metric 852 is indicative of a better shot than metric 802.

Figure 9A:
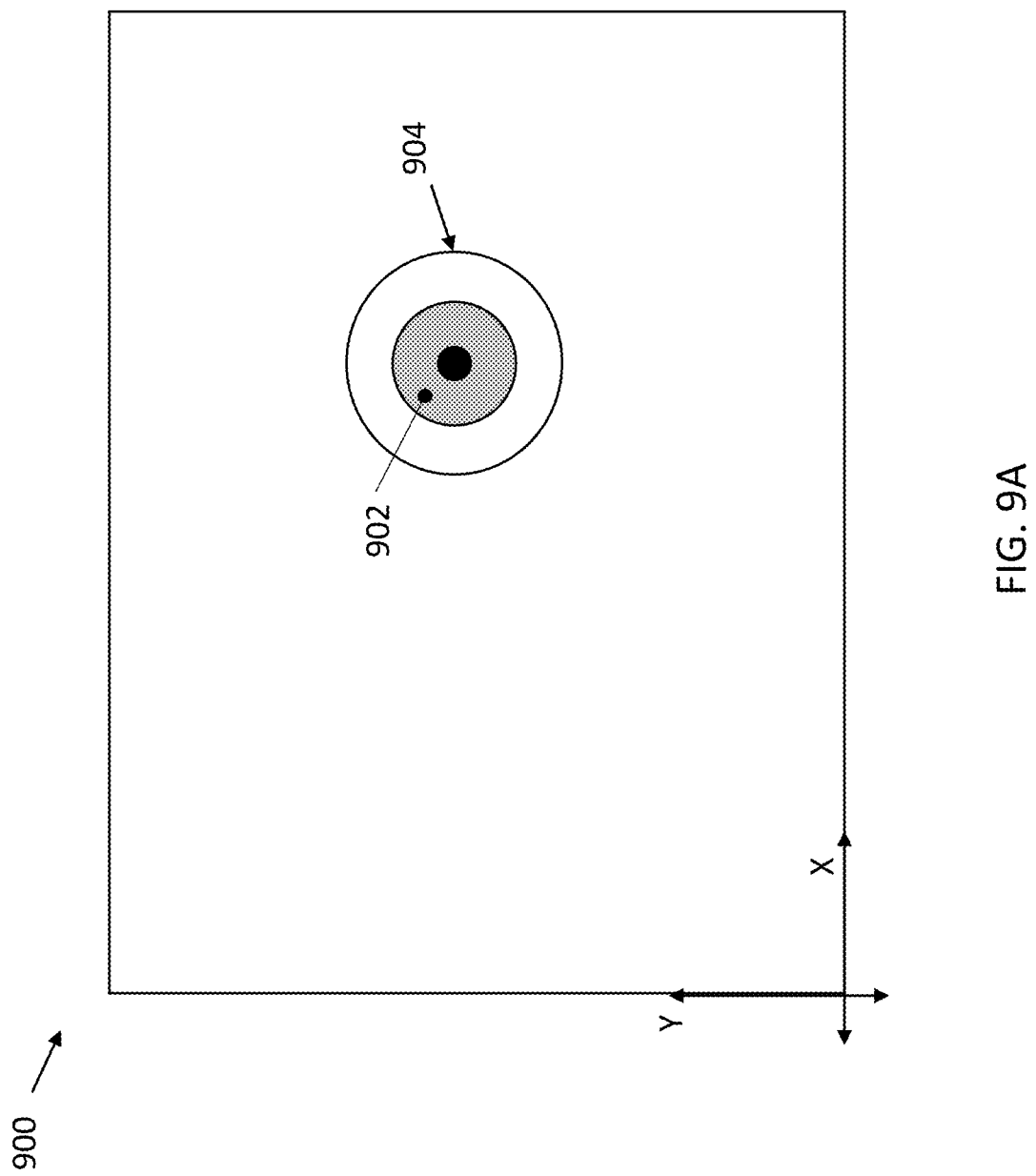

FIGS. 9A-9B graphically illustrate another example of metrics in a 2D space using a heat map, according to some embodiments. FIG. 9A graphically illustrates a first snapshot 900, according to some embodiments. The first pose 902 associated with the input device is a 2D position, and the second pose 904 associated with the target is a heat map. As shown in FIG. 9A, the user's aim as indicated by the pose 902 on the heat map 904 would result in a shot with a medium score, since the shot is at the middle ring of the heat map. While the metric is not shown in FIG. 9A, the metric can be a number and/or other value indicative of the medium score of the shot. FIG. 9B graphically illustrates a second snapshot 950, according to some embodiments. Like FIG. 9A, the first pose 952 associated with the input device is a 2D position, and the second pose 954 associated with the target is a heat map. As shown in FIG. 9B, the user's aim as indicated by the pose 952 on the heat map 954 would result in a shot with a low score, since the shot is at the outermost ring of the heat map. While the metric is not shown in FIG. 9B, the metric can be a number and/or other value indicative of the medium score of the shot. Comparing the metrics of the snapshots 900 and 950, the snapshot 900 has a better metric.

Referring to steps 510 and 512, in some embodiments the video game console can compare the metrics of the plurality of snapshots to determine which snapshot has the highest metric, and determine the adjusted pose based on the determined snapshot. For example, the video game console can determine that snapshot 660 in FIG. 6C has the best metric compared to snapshots 600 and 630 in FIGS. 6A-6B, respectively, and determine the adjusted pose based on the snapshot 660. In some embodiments, the adjusted pose can be set to the pose of the input device in the determined snapshot. In some embodiments, the adjusted pose can be determined based on both the initial pose associated with the input and the first pose of the determined snapshot. For example, the initial pose associated with the input can be adjusted partially based on the first pose of the determined snapshot (e.g., improved by a certain percentage), rather than simply setting the adjusted pose to be the first pose.

Referring further to steps 510 and 512, in some embodiments the video game console can compare the metrics of the plurality of snapshots to determine two or more snapshots with higher metrics than one or more remaining snapshots of the plurality of snapshots (e.g., by comparing the metrics among each other, by comparing the metrics to a threshold, and/or the like). The video game console can determine the adjusted pose based on the determined two or more snapshots. For example, the adjusted pose can be determined based on a weighting function of the first poses in the two or more snapshots. The weightings can, for example, weight each snapshot equally, weight snapshots closer in time to the input higher than snapshots further away in time from the input, weight snapshots closer in time to the input lower than snapshots further away in time from the input, and/or the like.

While exemplary metrics have been discussed that are determined based on a distance or a heat map, other metrics can also be used. In some embodiments, the metrics can be based on the particular aspects of the video game. For example, a metric can be the number of times an aimed laser bounces off of reflected surfaces (e.g., where the more times the laser bounces off reflected surfaces in the game, the better the shot). As another example, a metric can be a shot that causes the target to ricochet in a direction to hit the maximum number of other targets.

Figure 10:
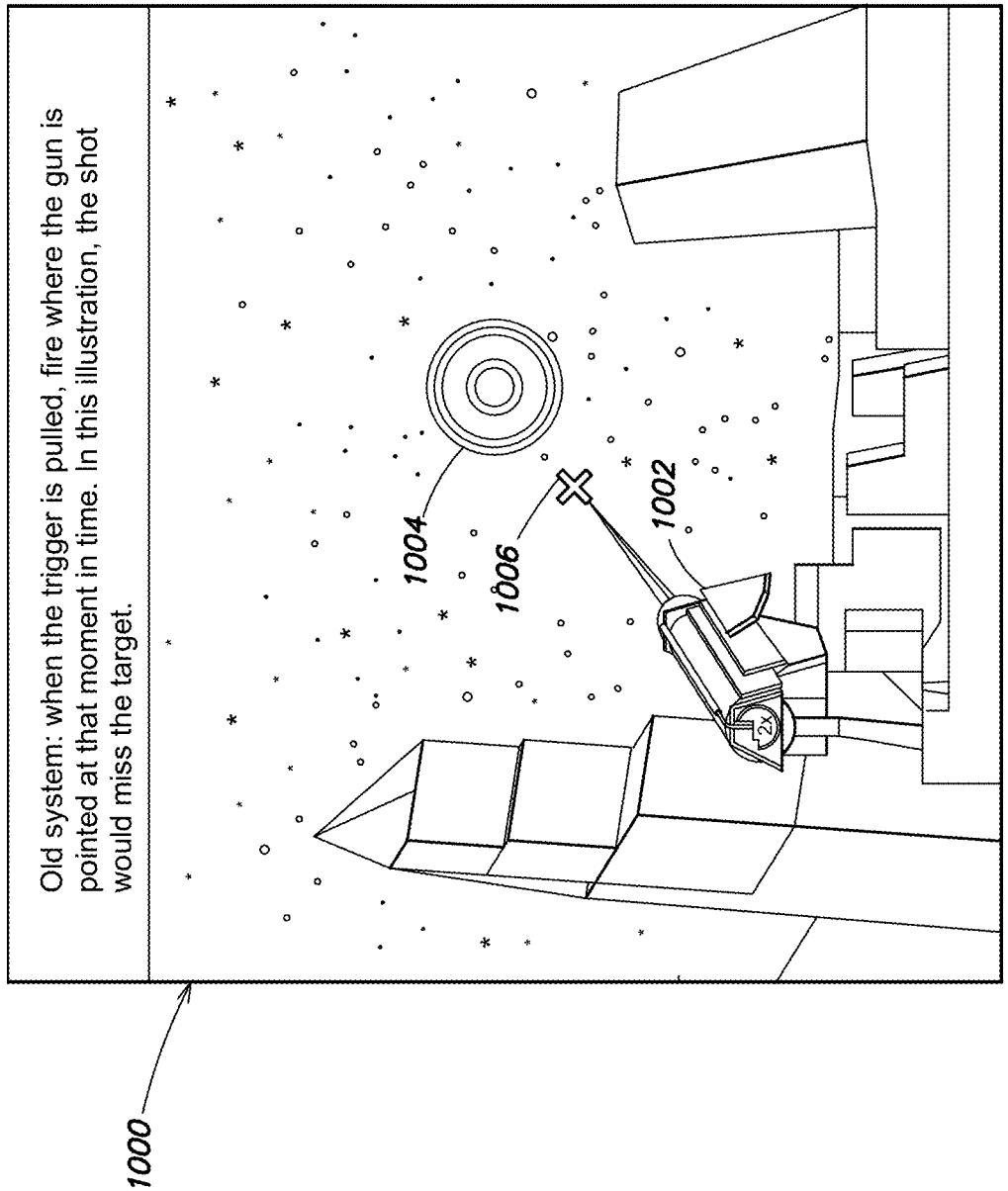
FIG. 10 shows an exemplary display of Harmonix's AUDICA™ virtual reality (VR) rhythm shooting game, according to some examples.

The techniques described herein can be used to improve player aim for the Harmonix's AUDICA™ VR rhythm shooter game. AUDICA™ can be played using various VR platforms, such as using a PC configured to work with a VR headset (e.g., the HTC Vive or Oculus Rift headsets) and associated spatially tracked controllers. FIG. 10 shows an exemplary display 1000 of Harmonix's AUDICA™ game, according to some examples. In the display 1000, the user is to aim the gun 1002 at the target 1004. When the user presses the trigger (e.g., a button) on the spatially tracked controller of the VR platform, it causes the user's aim to move to location 1006, rather than at the target 1004 (e.g., since the controller is light, and therefore pressing the button unintentionally moves the user's controller). The result is that the game fires where the gun is pointed at the moment in time that the trigger is pressed, resulting in a missed shot.

Figure 11:
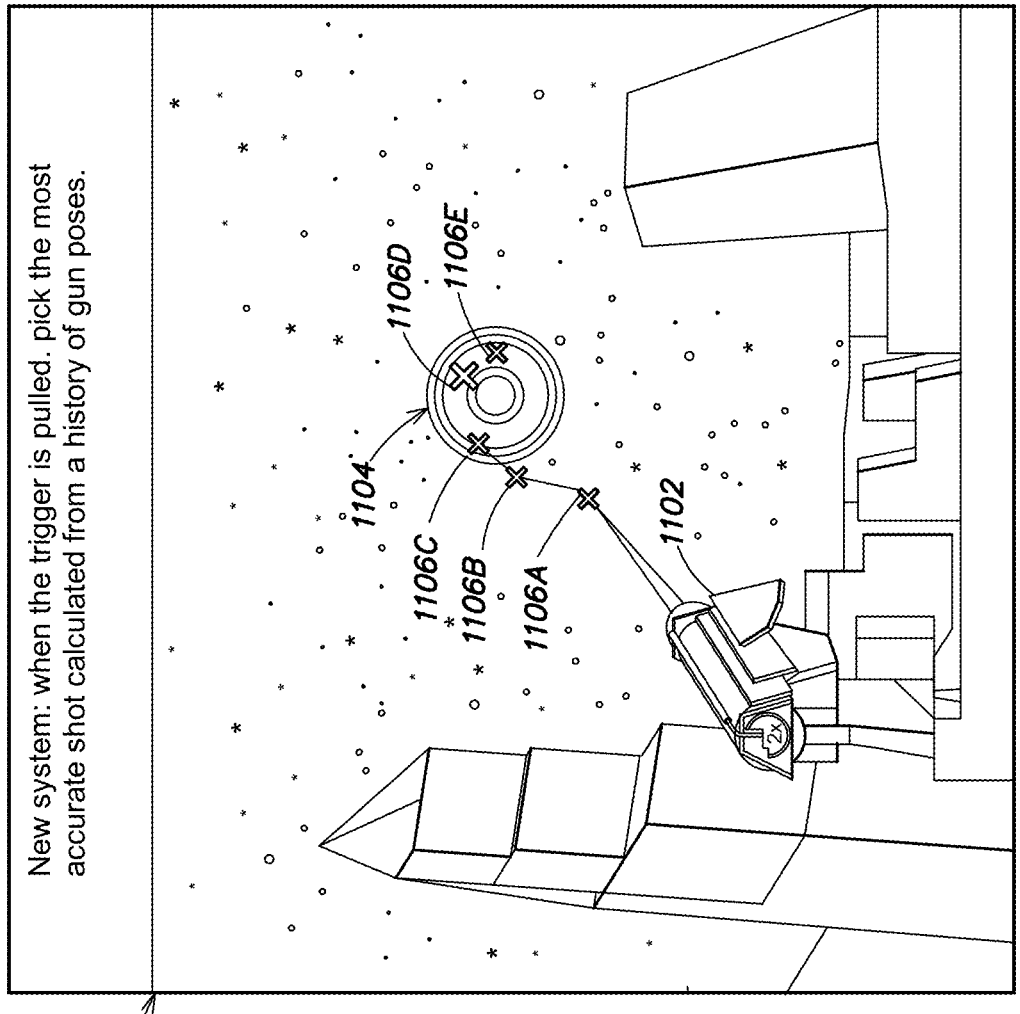
FIG. 11 shows an exemplary display of Harmonix's AUDICA™ VR rhythm shooting game using the techniques described herein, according to some embodiments.

FIG. 11 shows an exemplary display 1100 of Harmonix's AUDICA™ game using the techniques described herein, according to some embodiments. Like with FIG. 10, in the display 1100, the user is to aim the gun 1102 at the target 1104. The system keeps track of the last five snapshots, including where the user was aiming for each of those snapshots, which are shown as aiming location 1106A through aiming location 1106E. When the user presses the trigger on the controller, rather than simply firing at the aiming location 1106A (e.g., like with FIG. 10), the gaming system uses the five snapshots to determine which location to fire from. In this example, the system computes a metric for each snapshot to determine which of the five aiming locations is the most accurate, which is location 1106D. Upon determining location 1106D is the most accurate, the gaming platform fires at location 1106D instead of location 1106A. Therefore, the techniques described herein can be used to improve player performance of AUDICA™, since the shot in example 1100 is a successful shot, whereas otherwise the shot would be unsuccessful due to unintentional controller motion.

The various methods or processes outlined herein may be coded as software that is executable on one or more processors that employ any one of a variety of operating systems or platforms. Additionally, such software may be written using any of numerous suitable programming languages and/or programming or scripting tools, and also may be compiled as executable machine language code or intermediate code that is executed on a virtual machine or a suitable framework.

In this respect, various inventive concepts may be embodied as at least one non-transitory computer readable storage medium (e.g., a computer memory, one or more floppy discs, compact discs, optical discs, magnetic tapes, flash memories, circuit configurations in Field Programmable Gate Arrays or other semiconductor devices, etc.) encoded with one or more programs that, when executed on one or more computers or other processors, implement the various embodiments of the present invention. The non-transitory computer-readable medium or media may be transportable, such that the program or programs stored thereon may be loaded onto any computer resource to implement various aspects of the present invention as discussed above.

The terms "program," "software," and/or "application" are used herein in a generic sense to refer to any type of computer code or set of computer-executable instructions that can be employed to program a computer or other processor to implement various aspects of embodiments as discussed above. Additionally, it should be appreciated that according to one aspect, one or more computer programs that when executed perform methods of the present invention need not reside on a single computer or processor, but may be distributed in a modular fashion among different computers or processors to implement various aspects of the present invention.

Computer-executable instructions may be in many forms, such as program modules, executed by one or more computers or other devices. Generally, program modules include routines, programs, objects, components, data structures, etc. that perform particular tasks or implement particular abstract data types. Typically, the functionality of the program modules may be combined or distributed as desired in various embodiments.

Also, data structures may be stored in non-transitory computer-readable storage media in any suitable form. Data structures may have fields that are related through location in the data structure. Such relationships may likewise be achieved by assigning storage for the fields with locations in a non-transitory computer-readable medium that convey relationship between the fields. However, any suitable mechanism may be used to establish relationships among information in fields of a data structure, including through the use of pointers, tags or other mechanisms that establish relationships among data elements.

Various inventive concepts may be embodied as one or more methods, of which examples have been provided. The acts performed as part of a method may be ordered in any suitable way. Accordingly, embodiments may be constructed in which acts are performed in an order different than illustrated, which may include performing some acts simultaneously, even though shown as sequential acts in illustrative embodiments.

The indefinite articles "a" and "an," as used herein in the specification and in the claims, unless clearly indicated to the contrary, should be understood to mean "at least one." As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This allows elements to optionally be present other than the elements specifically identified within the list of elements to which the phrase "at least one" refers, whether related or unrelated to those elements specifically identified.

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

Use of ordinal terms such as "first," "second," "third," etc., in the claims to modify a claim element does not by itself connote any priority, precedence, or order of one claim element over another or the temporal order in which acts of a method are performed. Such terms are used merely as labels to distinguish one claim element having a certain name from another element having a same name (but for use of the ordinal term).

The phraseology and terminology used herein is for the purpose of description and should not be regarded as limiting. The use of "including," "comprising," "having," "containing", "involving", and variations thereof, is meant to encompass the items listed thereafter and additional items.

Having described several embodiments of the invention in detail, various modifications and improvements will readily occur to those skilled in the art. Such modifications and improvements are intended to be within the spirit and scope of the invention. Accordingly, the foregoing description is by way of example only, and is not intended as limiting.

Various aspects are described in this disclosure, which include, but are not limited to, the following aspects:

1. A computerized method implemented by a processor in communication with a memory, wherein the memory stores computer-readable instructions that, when executed by the processor, cause the processor to perform: accessing data indicative of a set of snapshots of one or more aspects of a video game over time, wherein each of one or more of the set of snapshots: is associated with a timestamp; and comprises data indicative of: (a) a first pose associated with an input device, and (b) a state of a video game simulation at a time of the snapshot; receiving data indicative of: an input from the input device at a time occurring after one or more timestamps associated with the one or more snapshots; and an initial pose associated with the input device for the input; and determining an adjusted pose for the input based on a relationship, for each snapshot of the one or more snapshots, between (i) the first pose associated with the input device and (ii) the state of the video game simulation at the time of the snapshot.

2. The method of aspect 1, wherein the first pose associated with the input device comprises a ray, the ray comprising a position and a direction; and the state of the video game simulation comprises a position of a target.

3. The method of aspect 1, wherein the one or more snapshots comprise a first snapshot that is associated with a first timestamp, wherein the first timestamp is within (a) a predetermined time period before the time of the input, and/or (b) a predetermined number of snapshots before the time of the input; and the adjusted pose is the first pose associated with the input device of the first snapshot.

4. The method of aspect 1, wherein the one or more snapshots comprise a plurality of snapshots and the one or more timestamps comprise a plurality of timestamps, wherein each one of the plurality of snapshots is associated with a respective one of the plurality of timestamps, each of the plurality of timestamps being (a) within a predetermined time period before the time of the input, and/or (b) within a predetermined number of snapshots before the time of the input.

5. The method of aspect 4, further comprising determining, for each of at least some of the plurality of snapshots, a metric based on the first pose associated with the input device and the state of the video game simulation at the time of the snapshot.

6. The method of aspect 5, wherein the first pose associated with the input device comprises a ray, the ray comprising a position and a direction; the state of the video game simulation comprises a position of a target; and determining the metric for each of the at least some snapshots comprises determining an indication of accuracy of the ray pointing at the position.

7. The method of aspect 5, wherein determining the adjusted pose comprises: comparing determined metrics for the at least some snapshots to determine a snapshot of the at least some snapshots with a highest metric; and determining the adjusted pose based on the determined snapshot.

8. The method of aspect 7, wherein determining the adjusted pose based on the determined snapshot with the highest metric comprises determining the adjusted pose to be the first pose of the determined snapshot.

9. The method of aspect 7, wherein determining the adjusted pose comprises determining the adjusted pose based on the initial pose and the first pose of the determined snapshot.

10. The method of aspect 6, wherein determining the adjusted pose comprises: comparing the metrics of the at least some snapshots to determine a subset of two or more snapshots of the at least some snapshots with higher metrics than one or more remaining snapshots of the at least some snapshots; and determining the adjusted pose based on the determined subset of two or more snapshots.

11. The method of aspect 1, wherein the input device is a spatially tracked controller; and the input is indicative of a button press on the spatially tracked controller.

12. The method of aspect 1, wherein the state of the video game simulation at the time of the snapshot comprises a second pose associated with a target in the snapshot.

13. A non-transitory computer-readable media comprising instructions that, when executed by one or more processors on a computing device, are operable to cause the one or more processors to execute: accessing data indicative of a set of snapshots of one or more aspects of a video game over time, wherein each of one or more of the set of snapshots: is associated with a timestamp; and comprises data indicative of: (a) a first pose associated with an input device, and (b) a state of a video game simulation at a time of the snapshot; receiving data indicative of: an input from the input device at a time occurring after one or more timestamps associated with the one or more snapshots; and an initial pose associated with the input device for the input; and determining an adjusted pose for the input based on a relationship, for each snapshot of the one or more snapshots, between (i) the first pose associated with the input device and (ii) the state of the video game simulation at the time of the snapshot.

14. The non-transitory computer-readable media of aspect 13, wherein the first pose associated with the input device comprises a ray, the ray comprising a position and a direction; and the state of the video game simulation comprises a position of a target.

15. The non-transitory computer-readable media of aspect 13, wherein the one or more snapshots comprises a plurality of snapshots, and the instructions further cause the one or more processors to execute: determining a metric for each of at least some of the plurality of snapshots; comparing determined metrics for the at least some snapshots to determine a snapshot of the at least some snapshots with a highest metric; and determining the adjusted pose based on the determined snapshot with the highest metric.

16. The non-transitory computer-readable media of aspect 15, wherein the first pose associated with the input device comprises a ray, the ray comprising a position and a direction; the state of the video game simulation at the time of the snapshot comprises a position a target; and determining the metric for each of the at least some snapshots comprises determining an indication of accuracy of the ray pointing at the position.

17. A system comprising a memory storing instructions, and a processor configured to execute the instructions to perform: accessing data indicative of a set of snapshots of one or more aspects of a video game over time, wherein each of one or more of the set of snapshots: is associated with a timestamp; and comprises data indicative of: (a) a first pose associated with an input device, and (b) a state of a video game simulation at a time of the snapshot receiving data indicative of: an input from the input device at a time occurring after one or more timestamps associated with the one or more snapshots; and an initial pose associated with the input device for the input; and determining an adjusted pose for the input based on a relationship, for each snapshot of the one or more snapshots, between (i) the first pose associated with the input device and (ii) the second pose associated with the target.

18. The system of aspect 17, wherein the first pose associated with the input device comprises a ray, the ray comprising a position and a direction; and the state of the video game simulation comprises a position of a target.

19. The system of aspect 17, wherein the one or more snapshots comprise a first snapshot that is associated with a first timestamp, wherein the first timestamp is within (a) predetermined time period before the time of the input, and/or (b) a predetermined number of snapshots before the time of the input; and the processor is configured to execute the instructions to perform: determining the adjusted pose to be the first pose associated with the input device of the first snapshot.

20. The system of aspect 17, wherein the one or more snapshots comprises a plurality of snapshots, and the processor is configured to execute the instructions to perform: determining a metric for each of at least some of the plurality of snapshots; comparing determined metrics for the at least some snapshots to determine a snapshot of the at least some snapshots with a highest metric; and determining the adjusted post based on the determined snapshot with the highest metric.

21. The system of aspect 20, wherein the first pose associated with the input device comprises a ray, the ray comprising a position and a direction; the state of the video game simulation comprises a position of a target; and determining the metric for each of the at least some snapshots comprises determining an indication of accuracy of the ray pointing at the position.

What is claimed is:

1. A computerized method implemented by a processor in communication with a memory, wherein the memory stores computer-readable instructions that, when executed by the processor, cause the processor to perform:
    accessing data indicative of a set of snapshots of one or more aspects of a video game over time, wherein each of one or more of the set of snapshots:
    is associated with a timestamp; and
    comprises data indicative of:
        (a) a first pose associated with an input device, and
        (b) a state of a video game simulation at a time of the snapshot;
    receiving data indicative of:
        an input from the input device at a time occurring after one or more timestamps associated with the one or more snapshots; and
        an initial pose associated with the input device for the input; and
    determining an adjusted pose for the input based on a relationship, for each snapshot of the one or more snapshots, between (i) the first pose associated with the input device and (ii) the state of the video game simulation at the time of the snapshot.

2. The method of claim 1, wherein:
    the first pose associated with the input device comprises a ray, the ray comprising a position and a direction; and
    the state of the video game simulation comprises a position of a target.

3. The method of claim 1, wherein:
    the one or more snapshots comprise a first snapshot that is associated with a first timestamp, wherein the first timestamp is within (a) a predetermined time period before the time of the input, and/or (b) a predetermined number of snapshots before the time of the input; and
    the adjusted pose is the first pose associated with the input device of the first snapshot.

4. The method of claim 1, wherein the one or more snapshots comprise a plurality of snapshots and the one or more timestamps comprise a plurality of timestamps, wherein each one of the plurality of snapshots is associated with a respective one of the plurality of timestamps, each of the plurality of timestamps being (a) within a predetermined time period before the time of the input, and/or (b) within a predetermined number of snapshots before the time of the input.

5. The method of claim 4, further comprising determining, for each of at least some of the plurality of snapshots, a metric based on the first pose associated with the input device and the state of the video game simulation at the time of the snapshot.

6. The method of claim 5, wherein:
    the first pose associated with the input device comprises a ray, the ray comprising a position and a direction;
    the state of the video game simulation comprises a position of a target; and
    determining the metric for each of the at least some snapshots comprises determining an indication of accuracy of the ray pointing at the position.

7. The method of claim 5, wherein determining the adjusted pose comprises:
    comparing determined metrics for the at least some snapshots to determine a snapshot of the at least some snapshots with a highest metric; and
    determining the adjusted pose based on the determined snapshot.

8. The method of claim 7, wherein determining the adjusted pose based on the determined snapshot with the highest metric comprises determining the adjusted pose to be the first pose of the determined snapshot.

9. The method of claim 7, wherein determining the adjusted pose comprises determining the adjusted pose based on the initial pose and the first pose of the determined snapshot.

10. The method of claim 6, wherein determining the adjusted pose comprises:
    comparing the metrics of the at least some snapshots to determine a subset of two or more snapshots of the at least some snapshots with higher metrics than one or more remaining snapshots of the at least some snapshots; and
    determining the adjusted pose based on the determined subset of two or more snapshots.

11. The method of claim 1, wherein:
    the input device is a spatially tracked controller; and
    the input is indicative of a button press on the spatially tracked controller.

12. The method of claim 1, wherein the state of the video game simulation at the time of the snapshot comprises a second pose associated with a target in the snapshot.

13. A non-transitory computer-readable media comprising instructions that, when executed by one or more processors on a computing device, are operable to cause the one or more processors to execute:

accessing data indicative of a set of snapshots of one or more aspects of a video game over time, wherein each of one or more of the set of snapshots:
is associated with a timestamp; and
comprises data indicative of:
(a) a first pose associated with an input device, and
(b) a state of a video game simulation at a time of the snapshot;
receiving data indicative of:
an input from the input device at a time occurring after one or more timestamps associated with the one or more snapshots; and
an initial pose associated with the input device for the input; and
determining an adjusted pose for the input based on a relationship, for each snapshot of the one or more snapshots, between (i) the first pose associated with the input device and (ii) the state of the video game simulation at the time of the snapshot.

14. The non-transitory computer-readable media of claim 13, wherein:
the first pose associated with the input device comprises a ray, the ray comprising a position and a direction; and
the state of the video game simulation comprises a position of a target.

15. The non-transitory computer-readable media of claim 13, wherein the one or more snapshots comprises a plurality of snapshots, and the instructions further cause the one or more processors to execute:
determining a metric for each of at least some of the plurality of snapshots;
comparing determined metrics for the at least some snapshots to determine a snapshot of the at least some snapshots with a highest metric; and
determining the adjusted pose based on the determined snapshot with the highest metric.

16. The non-transitory computer-readable media of claim 15, wherein:
the first pose associated with the input device comprises a ray, the ray comprising a position and a direction;
the state of the video game simulation at the time of the snapshot comprises a position a target; and
determining the metric for each of the at least some snapshots comprises determining an indication of accuracy of the ray pointing at the position.

17. A system comprising a memory storing instructions, and a processor configured to execute the instructions to perform:
accessing data indicative of a set of snapshots of one or more aspects of a video game over time, wherein each of one or more of the set of snapshots:
is associated with a timestamp; and
comprises data indicative of:
(a) a first pose associated with an input device, and
(b) a state of a video game simulation at a time of the snapshot receiving data indicative of:
an input from the input device at a time occurring after one or more timestamps associated with the one or more snapshots; and
an initial pose associated with the input device for the input; and
determining an adjusted pose for the input based on a relationship, for each snapshot of the one or more snapshots, between (i) the first pose associated with the input device and (ii) the second pose associated with the target.

18. The system of claim 17, wherein:
the first pose associated with the input device comprises a ray, the ray comprising a position and a direction; and
the state of the video game simulation comprises a position of a target.

19. The system of claim 17, wherein the one or more snapshots comprise a first snapshot that is associated with a first timestamp, wherein the first timestamp is within (a) predetermined time period before the time of the input, and/or (b) a predetermined number of snapshots before the time of the input; and
the processor is configured to execute the instructions to perform:
determining the adjusted pose to be the first pose associated with the input device of the first snapshot.

20. The system of claim 17, wherein the one or more snapshots comprises a plurality of snapshots, and the processor is configured to execute the instructions to perform:
determining a metric for each of at least some of the plurality of snapshots;
comparing determined metrics for the at least some snapshots to determine a snapshot of the at least some snapshots with a highest metric; and
determining the adjusted post based on the determined snapshot with the highest metric.

21. The system of claim 20, wherein:
the first pose associated with the input device comprises a ray, the ray comprising a position and a direction;
the state of the video game simulation comprises a position of a target; and
determining the metric for each of the at least some snapshots comprises determining an indication of accuracy of the ray pointing at the position.

* * * * *